US011409560B2

(12) United States Patent
Jambur Sathyanarayana et al.

(10) Patent No.: US 11,409,560 B2
(45) Date of Patent: Aug. 9, 2022

(54) SYSTEM, APPARATUS AND METHOD FOR POWER LICENSE CONTROL OF A PROCESSOR

(71) Applicant: Intel Corporation, Santa Clara, CA (US)

(72) Inventors: Krishnamurthy Jambur Sathyanarayana, Limerick (IE); Robert Valentine, Kiryat Tivon (IL); Alexander Gendler, Kiriat Motzkin (IL); Shmuel Zobel, Hinanit (IL); Gavri Berger, Haifa (IL); Ian M. Steiner, Portland, OR (US); Nikhil Gupta, Portland, OR (US); Eyal Hadas, Haifa (IL); Edo Hachamo, Nahariya (IL); Sumesh Subramanian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 16/367,581

(22) Filed: Mar. 28, 2019

(65) Prior Publication Data

US 2020/0310872 A1 Oct. 1, 2020

(51) Int. Cl.

*G06F 9/48* (2006.01)
*G06F 9/38* (2018.01)
(Continued)

(52) U.S. Cl.

CPC ............ *G06F 9/4893* (2013.01); *G06F 1/324* (2013.01); *G06F 1/3206* (2013.01);
(Continued)

(58) Field of Classification Search

None
See application file for complete search history.

(56) References Cited

U.S. PATENT DOCUMENTS 8,190,939 B2 * 5/2012 Fields, Jr. ............ G06F 1/3203 713/324
8,984,305 B2 3/2015 Distefano et al.
(Continued)

FOREIGN PATENT DOCUMENTS

KR 1020130088132 8/2013

OTHER PUBLICATIONS

International Searching Authority, "Notification of Transmittal of the International Search Report and the Written Opinion of the International Searching Authority," dated Jul. 10, 2020, in International application No. PCT/US2020/023278.

*Primary Examiner* — Abu Zar Ghaffari
(74) *Attorney, Agent, or Firm* — Trop, Pruner & Hu, P.C.

(57) ABSTRACT

In one embodiment, a processor includes a current protection controller to: receive instruction width information and instruction type information associated with one or more instructions stored in an instruction queue prior to execution of the one or more instructions by an execution circuit; determine a power license level for the core based on the corresponding instruction width information and the instruction type information; generate a request for a license for the core corresponding to the power license level; and communicate the request to a power controller when the one or more instructions are non-speculative, and defer communication of the request when at least one of the one or more instructions is speculative. Other embodiments are described and claimed.

19 Claims, 27 Drawing Sheets

300
IF $380_0$
IF $380_n$
PCU 355
LGC 359
System Agent 350
Display Controller 352
IMC 370
330
Core $310_0$
LLC $340_0$
Core
LLC
310
Core
LLC
Core 310n
LLC 340n
Graphics Engine 320

(51) Int. Cl.
*G06F 9/30* (2018.01)
*G06F 9/4401* (2018.01)
*G06F 1/3206* (2019.01)
*G06F 1/324* (2019.01)
*G06F 1/3234* (2019.01)
*G06F 1/3296* (2019.01)

(52) U.S. Cl.
CPC .......... *G06F 1/3243* (2013.01); *G06F 1/3296* (2013.01); *G06F 9/30101* (2013.01); *G06F 9/3842* (2013.01); *G06F 9/4401* (2013.01); *Y02D 10/00* (2018.01)

(56) References Cited

U.S. PATENT DOCUMENTS 9,003,215 B2 * 4/2015 Marshall ................. G06F 1/329 713/323
10,551,901 B2 * 2/2020 Sen ......................... G06F 1/324
10,969,812 B1 * 4/2021 Boneh ....................... G05F 1/66
2007/0043960 A1 2/2007 Bose et al.
2008/0168233 A1 * 7/2008 Luc ..................... G06F 12/0897 711/133
2012/0084589 A1 4/2012 Millet et al.
2014/0317422 A1 10/2014 Rosenzweig et al.
2015/0161307 A1 * 6/2015 Ueki ..................... G06F 30/367 716/136
2015/0177799 A1 6/2015 Gendler
2015/0178138 A1 * 6/2015 Saha ..................... G06F 9/5094 718/104
2015/0242210 A1 * 8/2015 Kim ...................... G06F 9/3887 712/7
2015/0268997 A1 * 9/2015 Svilan ..................... G06F 1/329 718/102
2016/0098078 A1 4/2016 Kumar et al.
2017/0083315 A1 * 3/2017 Burger .................. G06F 9/3802
2018/0032335 A1 * 2/2018 Smith ................... G06F 9/3828
2019/0146566 A1 * 5/2019 Pineda De Gyvez ....................... G06F 1/3228 713/322

* cited by examiner

2000

| Uop | 64b | 128b | 256b | 512b |
| --- | --- | --- | --- | --- |
| LD | 0 | 0 | 1 | 1 |
| ST | 0 | 0 | 1 | 1 |
| SIMD | 0 | 1 | 2 | 3 |
| FMA | N/A | 1 | 2 | 3 |

SYSTEM, APPARATUS AND METHOD FOR POWER LICENSE CONTROL OF A PROCESSOR

TECHNICAL FIELD

Embodiments relate to power management of a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

BRIEF DESCRIPTION OF THE DRAWINGS

FIG. 20 is a block diagram of a configuration storage, which may be present in a register alias table or other out of order engine of a processor.

DETAILED DESCRIPTION

Figure 1:
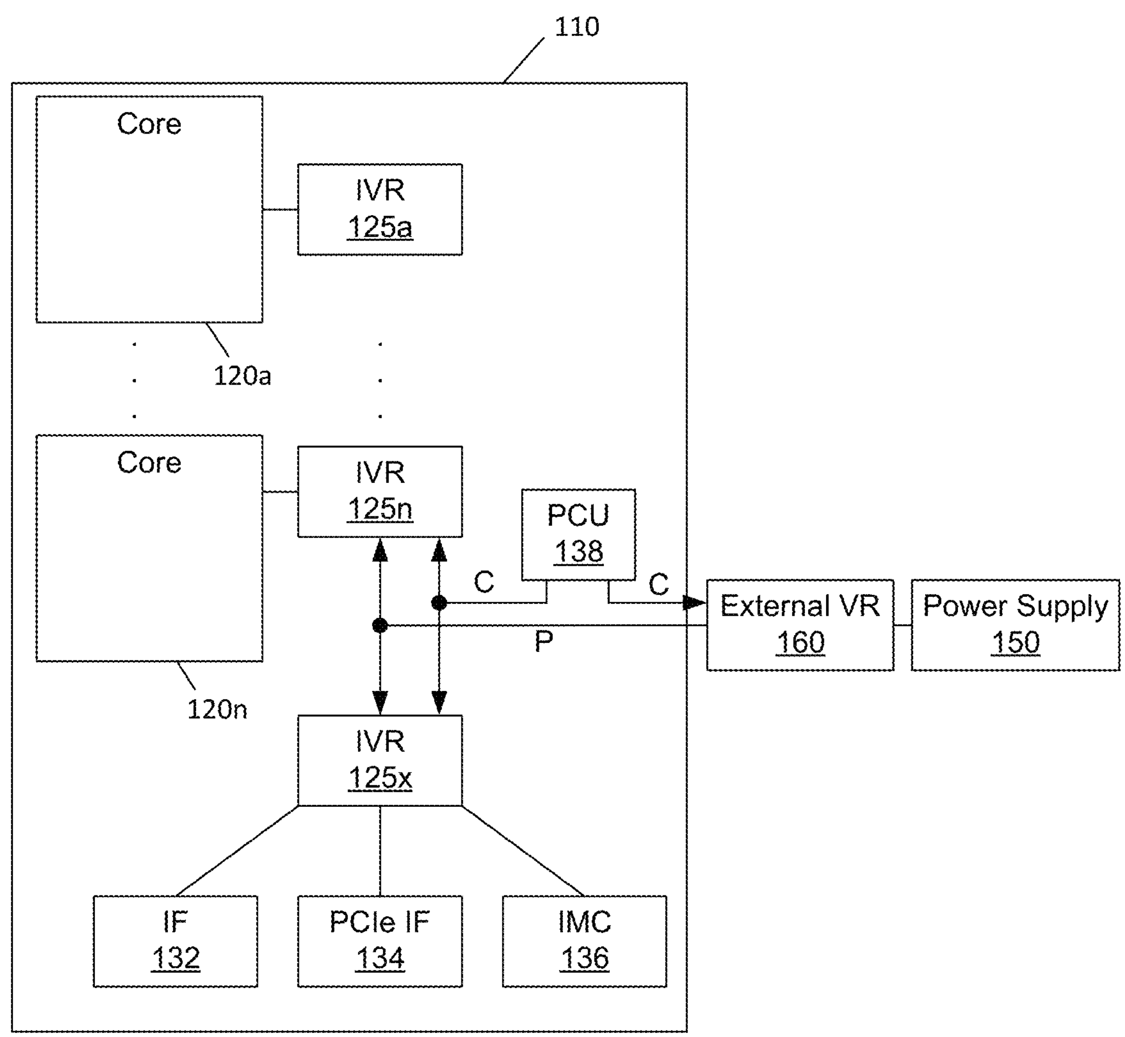
FIG. 1 is a block diagram of a portion of a system in accordance with an embodiment of the present invention.

In various embodiments, a processor is configured with power management circuitry to dynamically determine during processor operation, appropriate power license levels to grant to processing cores or other processing circuits in response to requests from license grants received from these agents. In general, requests for increased power license levels may be made when a core encounters higher power consuming instructions, including certain wide instructions such as vector-based instructions. Embodiments may allow certain such wide instructions, including memory access instructions for vector widths, to be performed at lower license levels, reducing the number of requests for higher license levels. In addition, embodiments may configure cores to defer requesting of license grants for instructions that are speculative in nature. In this way, some number of higher power licenses are not requested, reducing impact to processor performance.

In addition, embodiments further may provide for per core configurable power consumption levels, such as thermal design power (TDP) levels. In this way, in connection with scheduling workloads to one or more cores, an indication of the power consuming nature of the workload can be identified from the scheduler to a power controller to enable a configurable TDP level for the core to be set, e.g., at a lower level. In this way, a pre-grant of a frequency license for operation of the workload at a guaranteed operating frequency may occur, such that the overhead of performing a license negotiation between a core and a power controller is avoided, reducing latency of workload execution.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $\mathbf{120}_a$-$\mathbf{120}_n$. In addition, each core may be associated with an integrated voltage regulator (IVR) $\mathbf{125}_a$-$\mathbf{125}_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $\mathbf{125}_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

One power management logic unit included in PCU 138 may be a license grant circuit. Such license grant circuit may receive incoming requests for power licenses and based at least in part on one or more budgets, provide license grants to given cores 120 for execution at a given power level. Still further, this license grant circuit further may provide a pre-grant of a frequency license to a given core 124 execution of a workload, based on scheduling information that causes a setting of a per core configurable TDP value, as described herein.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
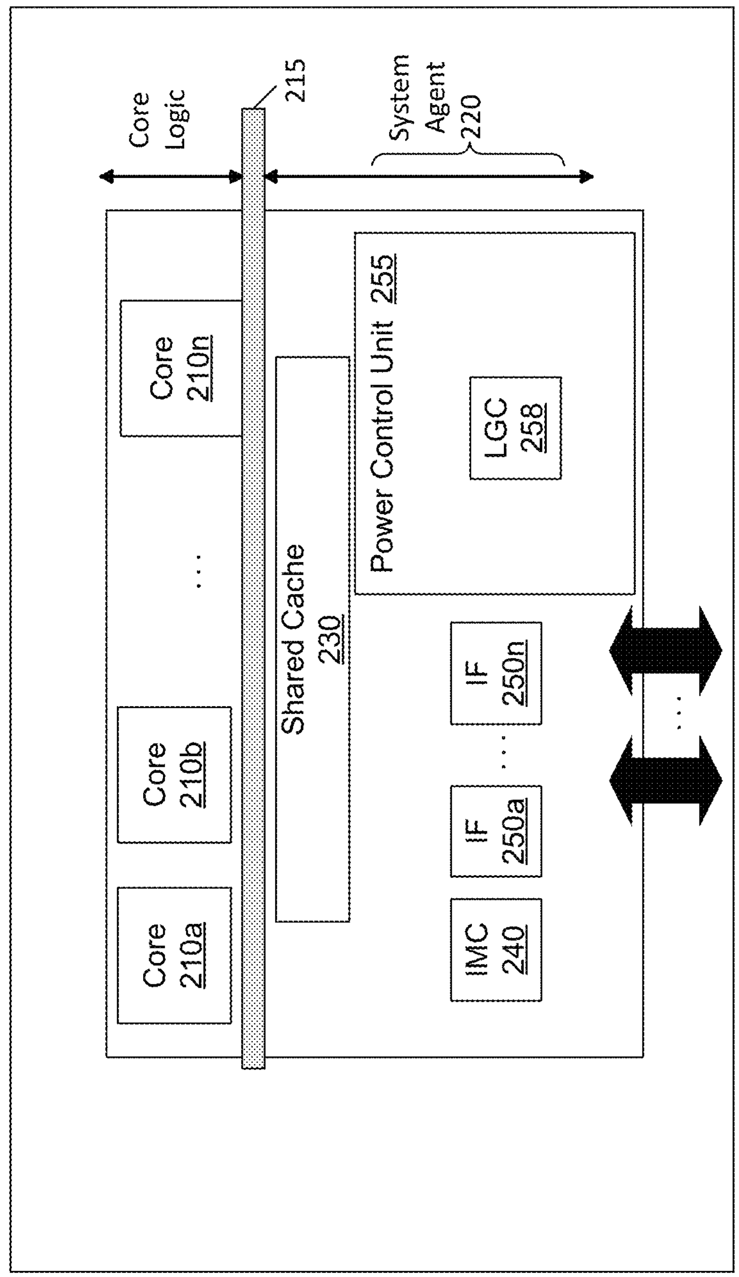
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $\mathbf{210}_a$-$\mathbf{210}_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. A license grant circuit 258 that may grant power licenses to cores 210 based on license requests for non-speculative instruction execution. License grant circuit 258 further may provide a pre-grant of a frequency license for a guaranteed operating frequency to a given core 210 for execution of a certain workload based on a per core configurable TDP value, as described herein.

In addition, by interfaces **250*a*-250*n*, connection can be made to various off-chip components such as peripheral devices, mass storage and so forth. While shown with this particular implementation in the embodiment of FIG. 2**, the scope of the present invention is not limited in this regard.

Figure 3:
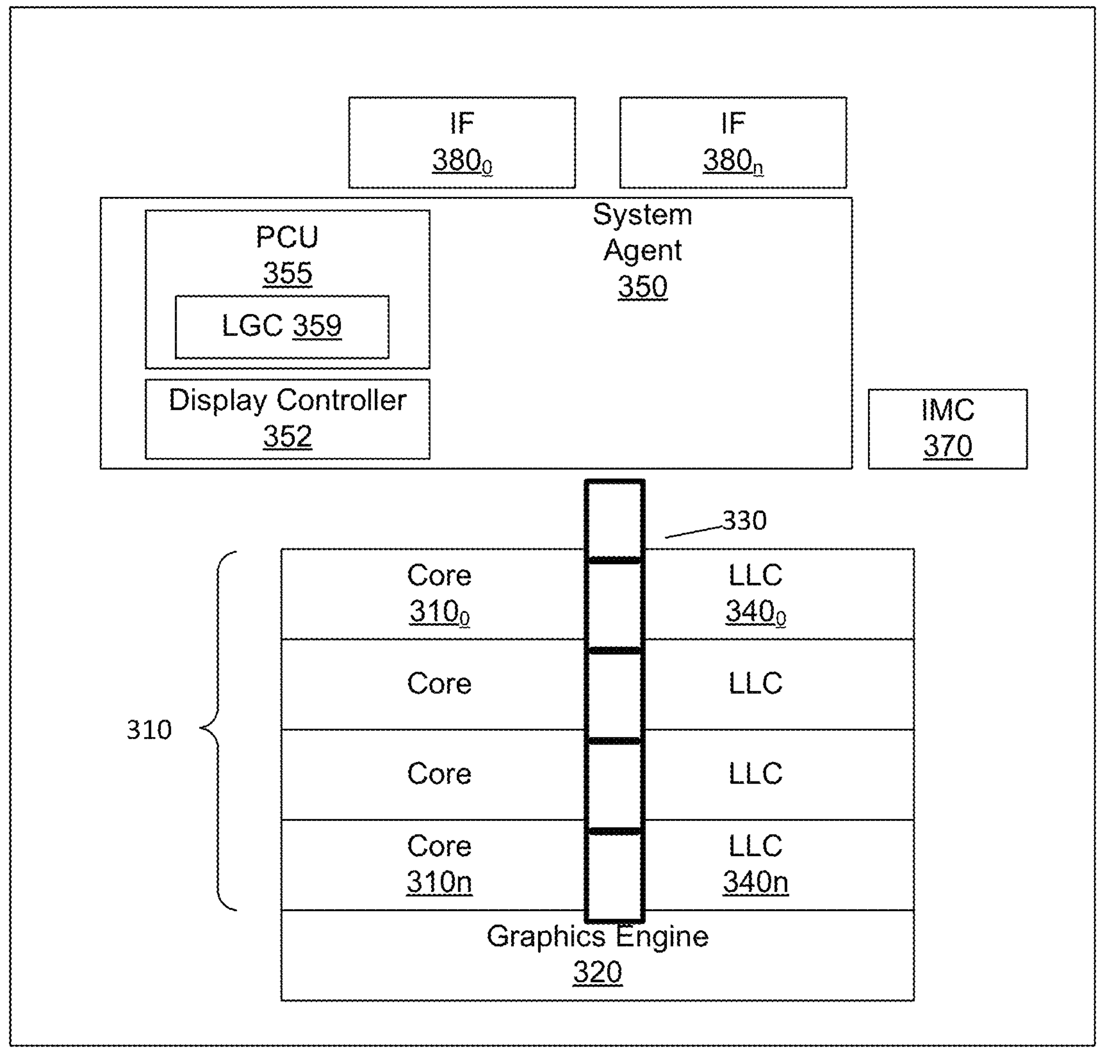
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $\mathbf{310}_0$-$\mathbf{310}_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $\mathbf{340}_0$-$\mathbf{340}_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a license grant circuit 359 to perform power license grants in response to request for non-speculative instruction execution, and pre-grants of frequency licenses for workload execution based on per core TDP values, as described herein.

As further seen in FIG. 3, processor 300 can further include an integrated memory controller (IMC) 370 that can provide for an interface to a system memory, such as a dynamic random access memory (DRAM). Multiple interfaces $\mathbf{380}_0$-$\mathbf{380}_n$ may be present to enable interconnection between the processor and other circuitry. For example, in one embodiment at least one direct media interface (DMI)

interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
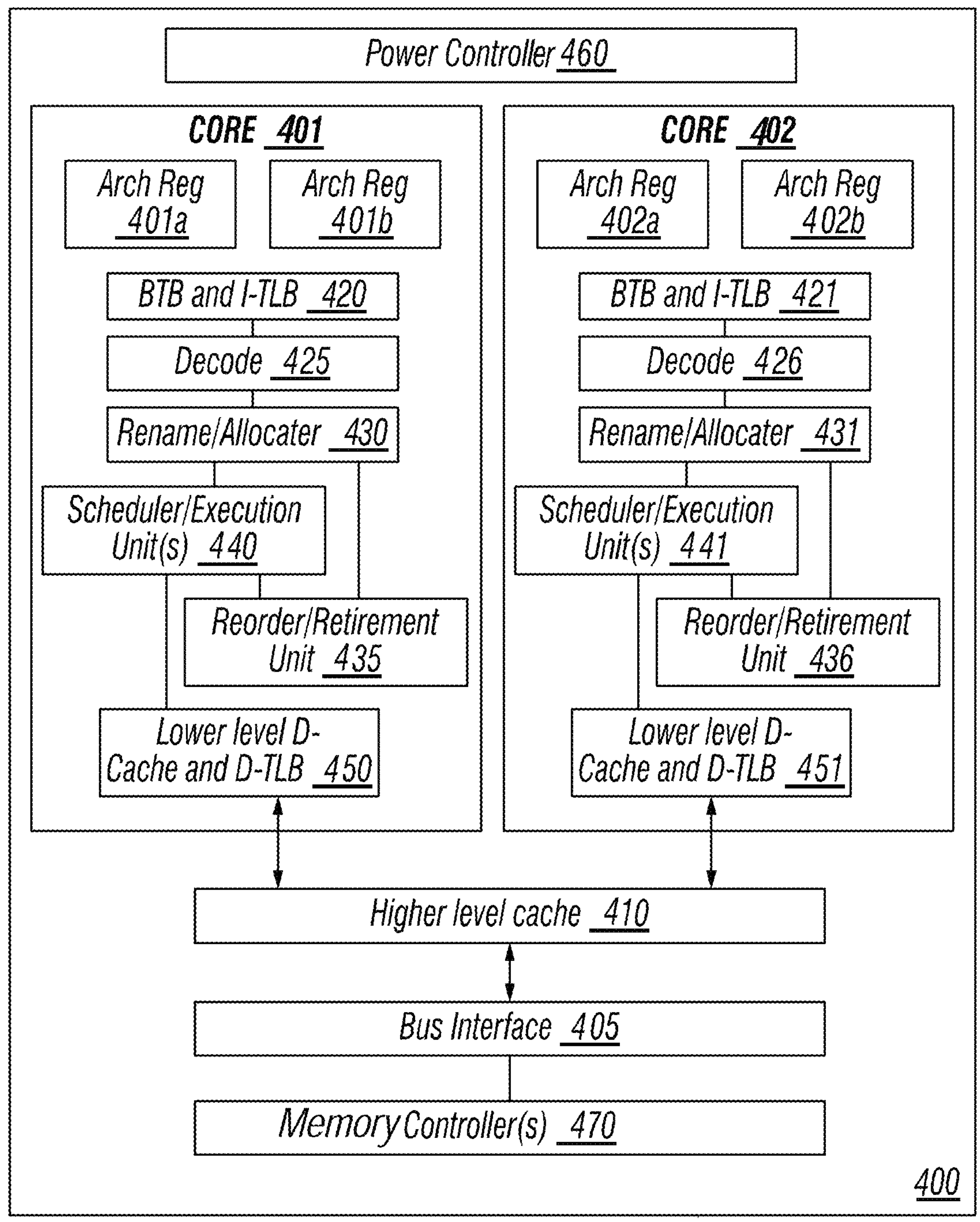
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
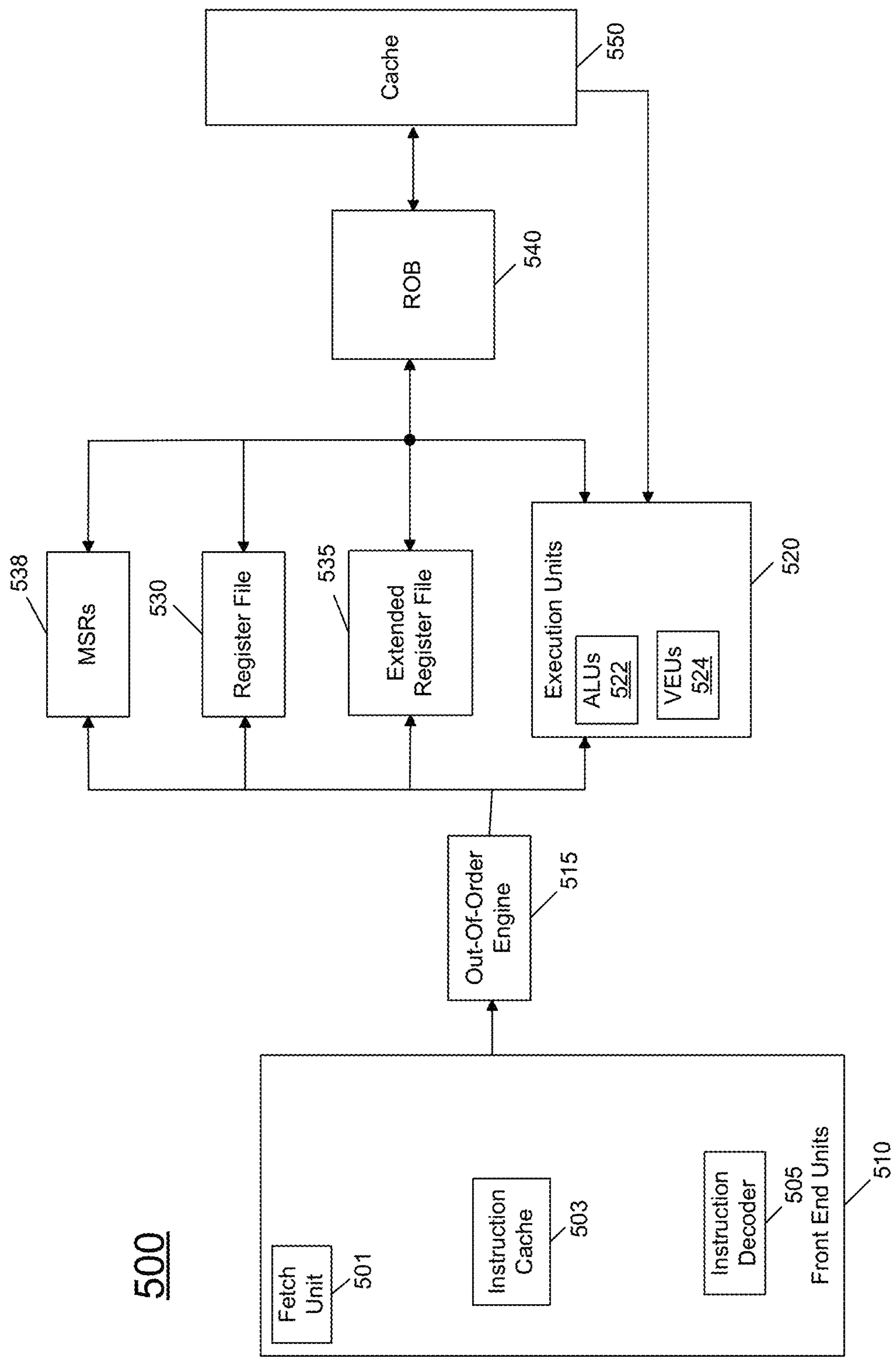
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
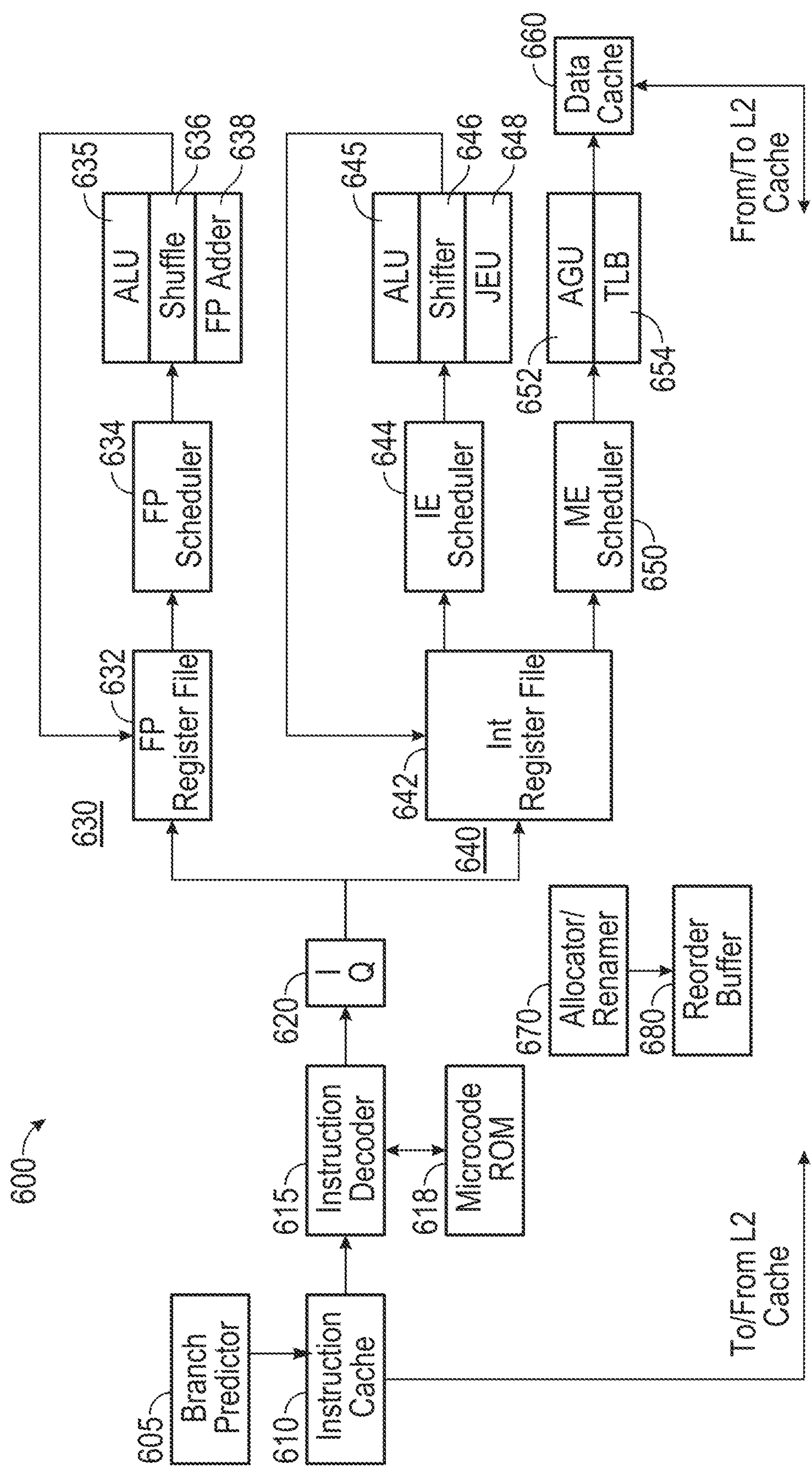
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
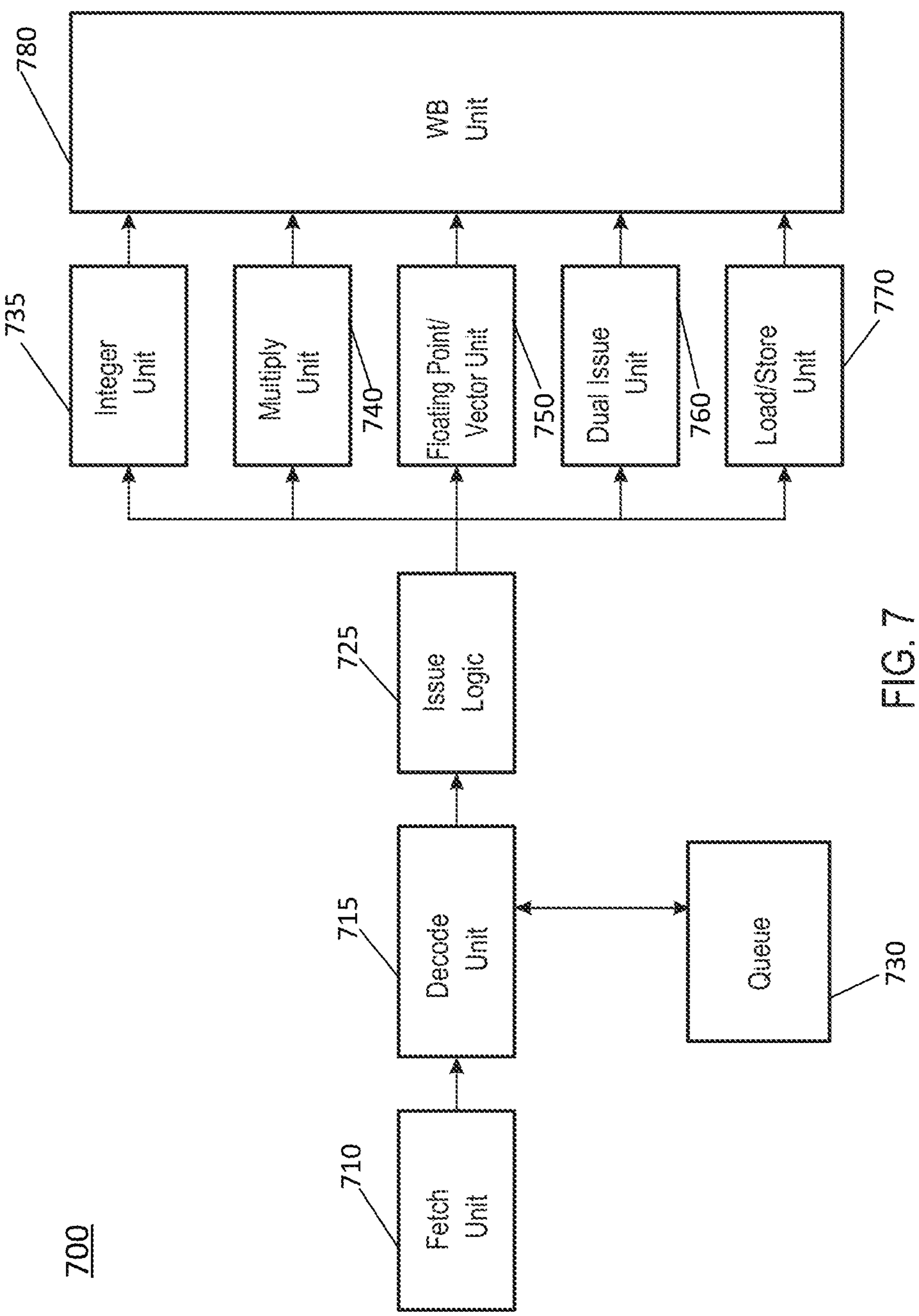
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
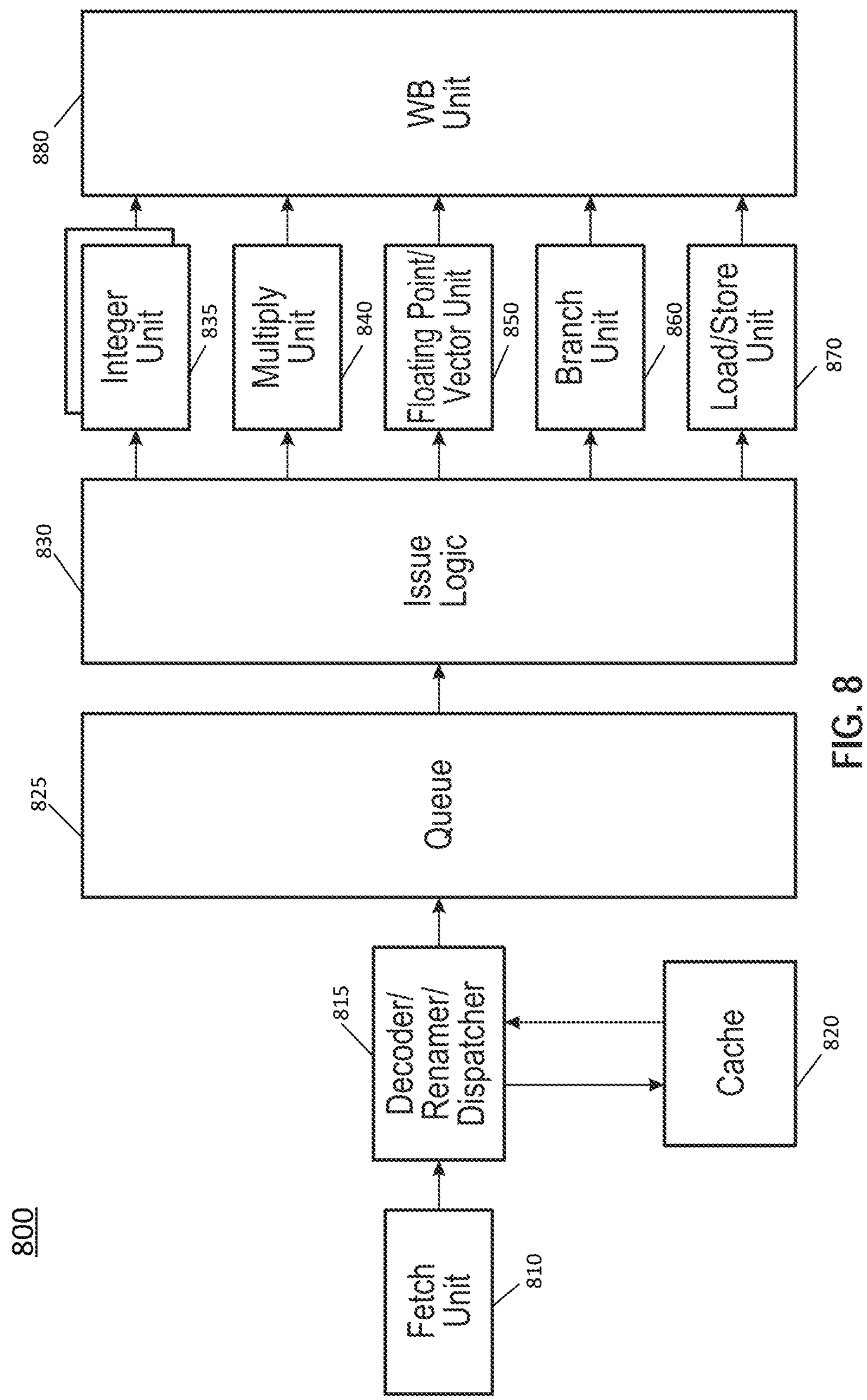
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
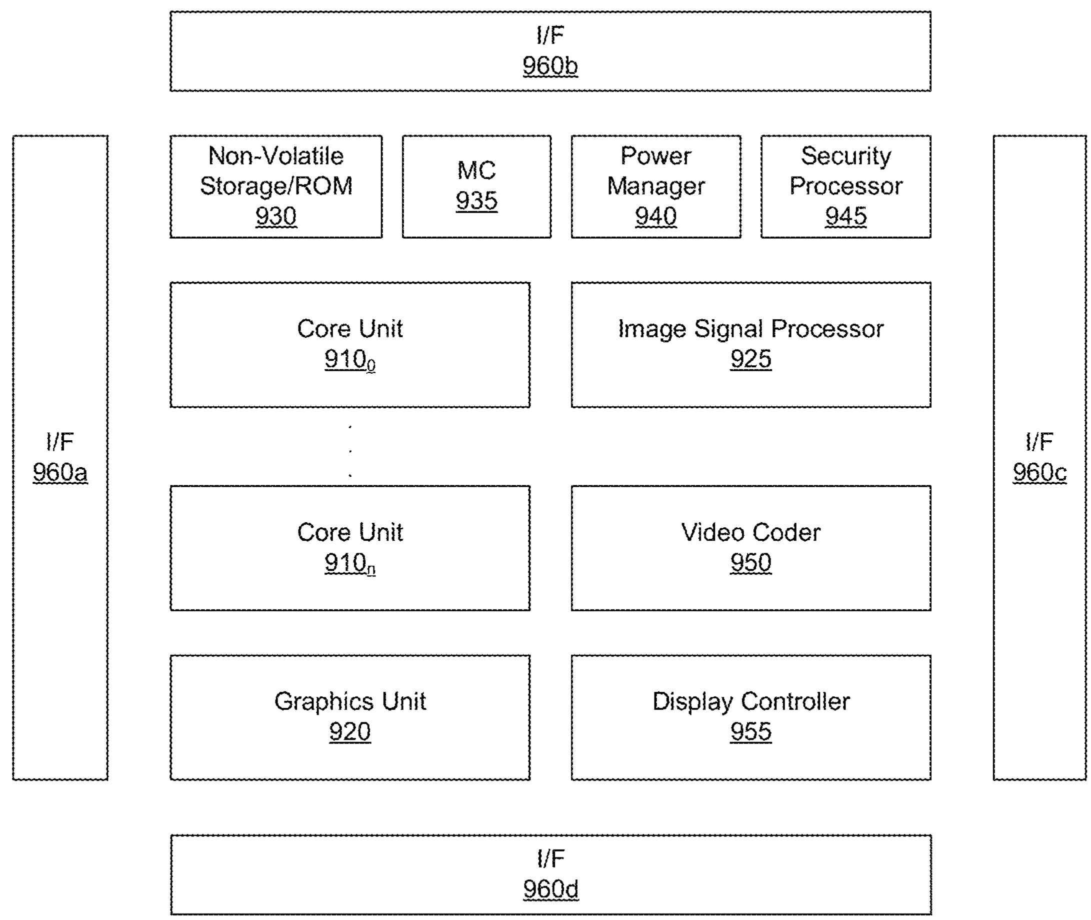
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $\mathbf{910}_0$-$\mathbf{910}_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, $I^2C$, UART, MIPI, SDIO, DDR, SPI, HDMI, among other types of communication protocols. Although shown at this high level in the embodiment of FIG. 9, understand the scope of the present invention is not limited in this regard.

Figure 10:
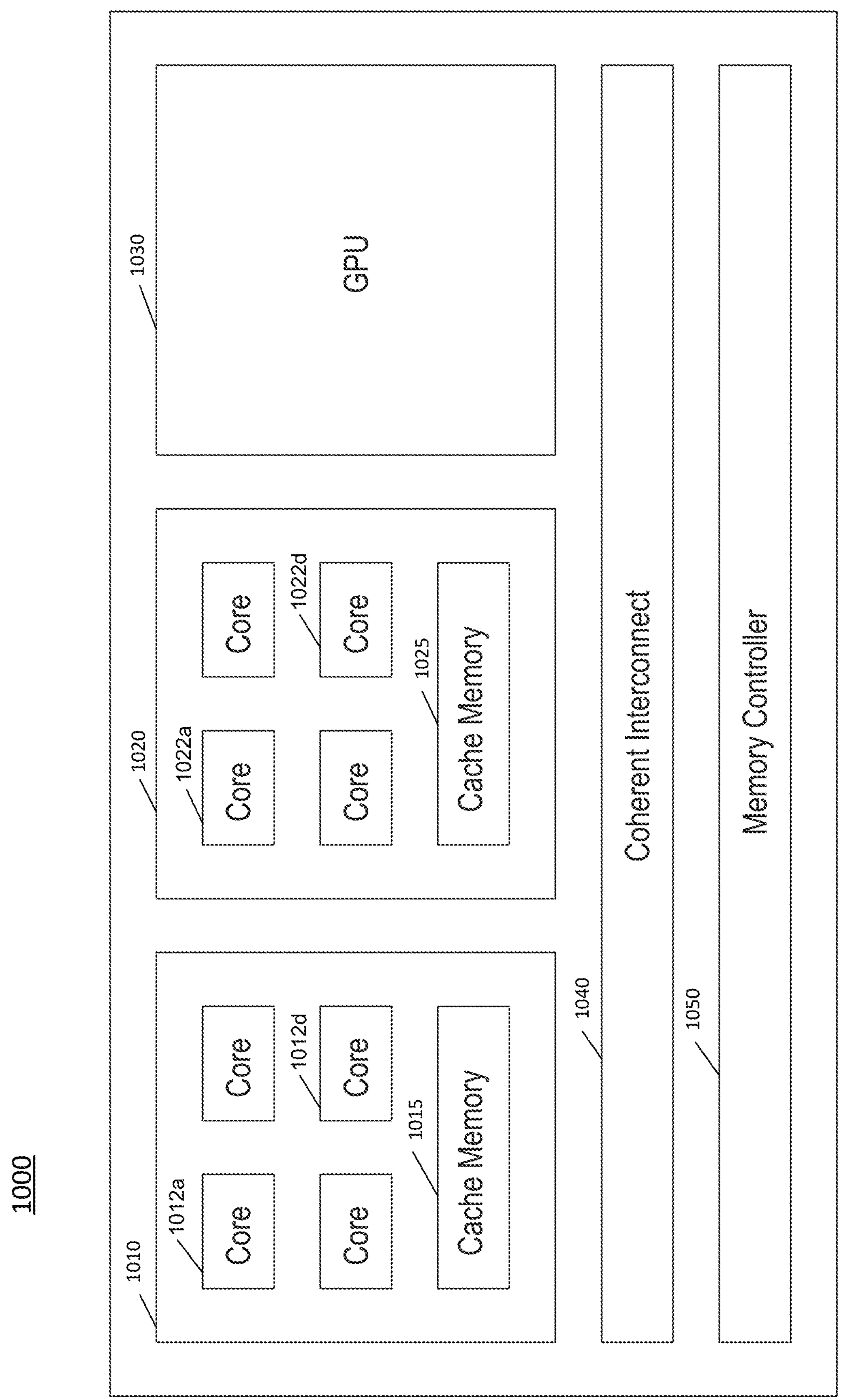
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $\mathbf{1012}_0$-$\mathbf{1012}_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $\mathbf{1022}_0$-$\mathbf{1022}_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
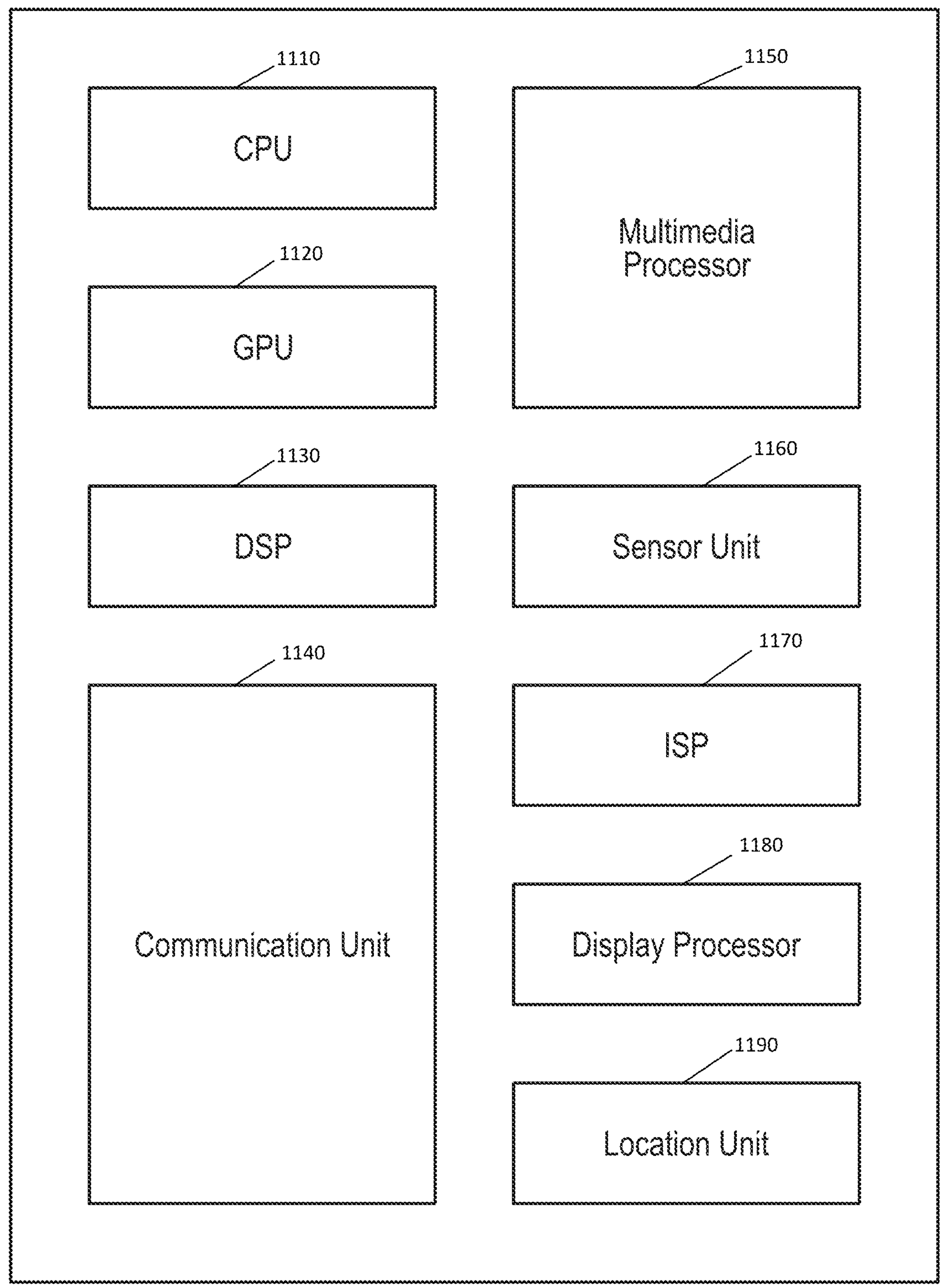
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
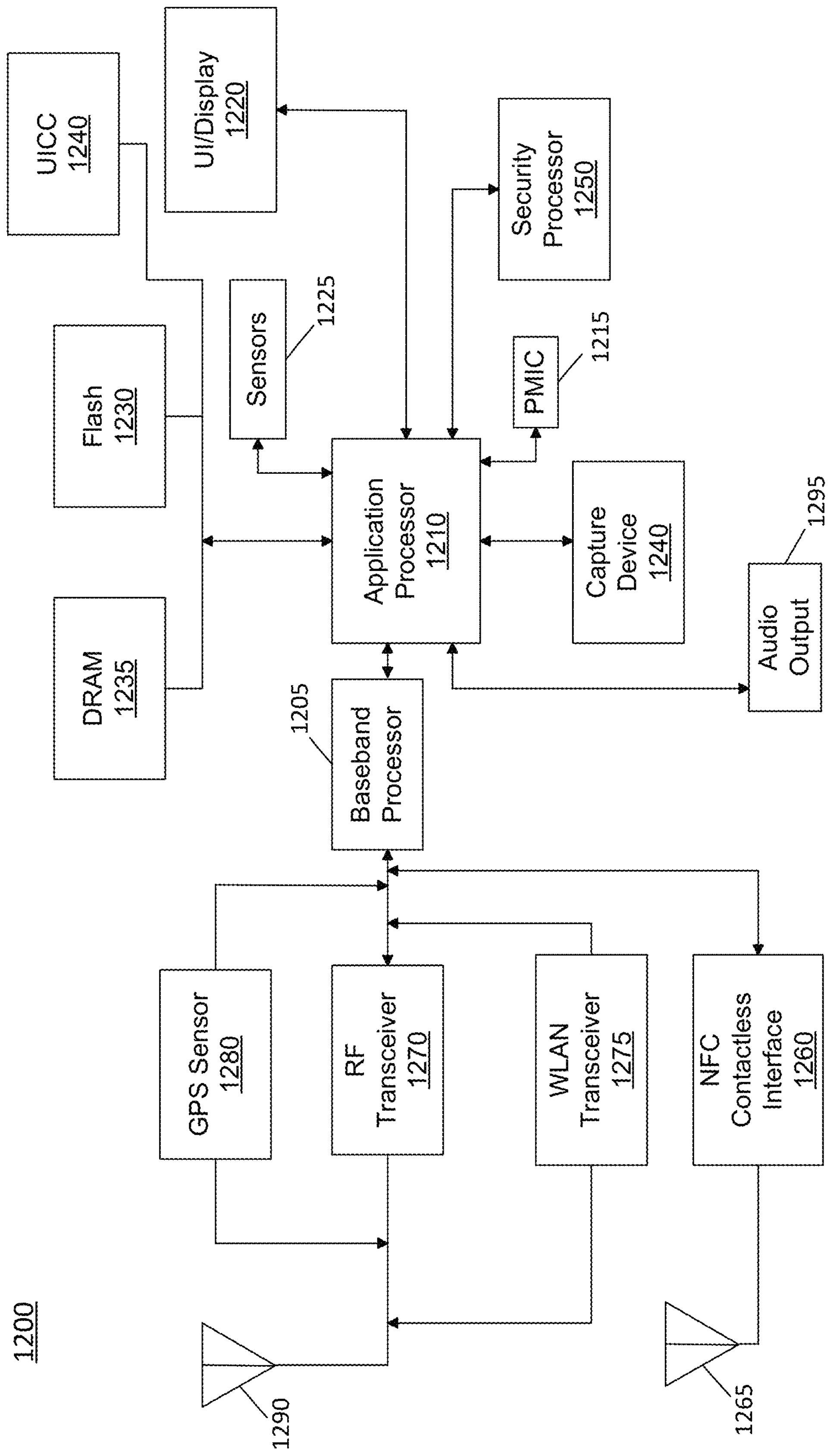
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
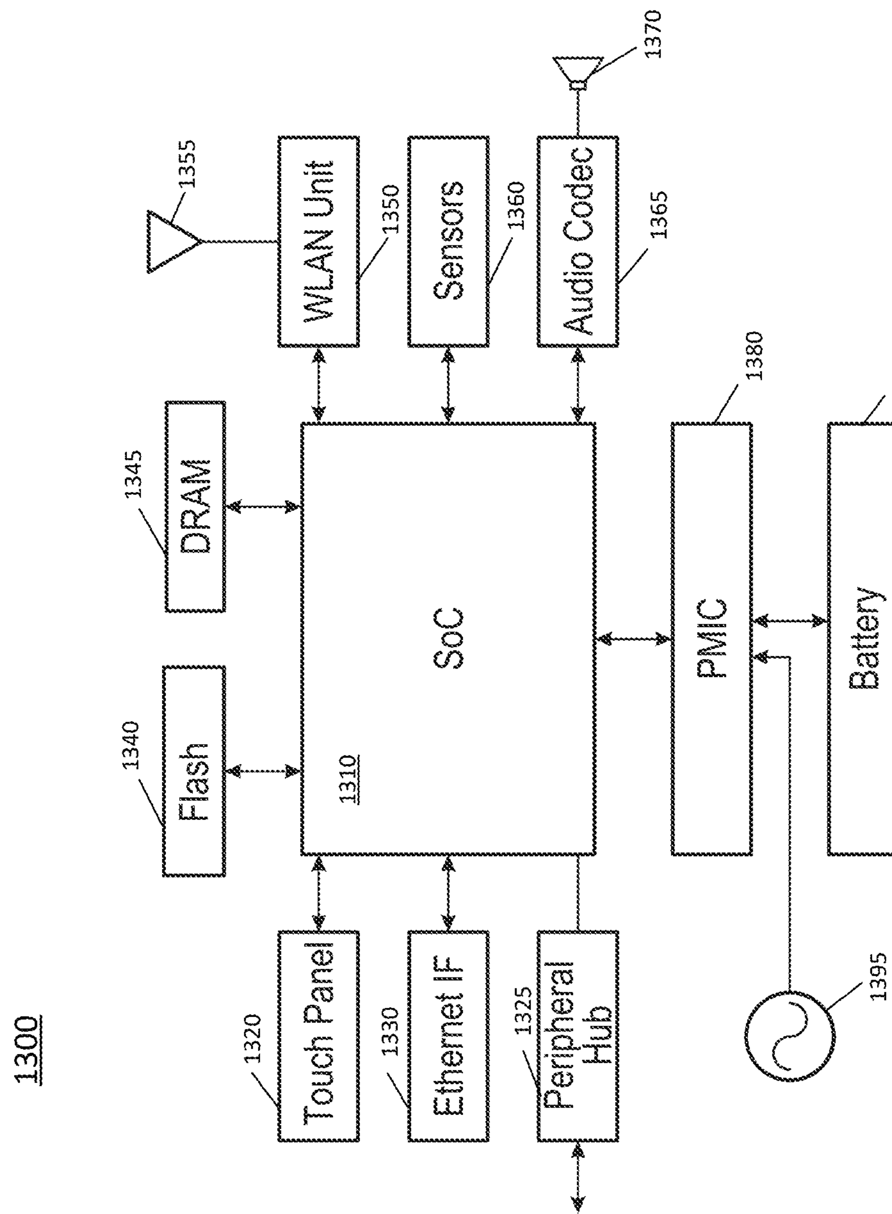
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
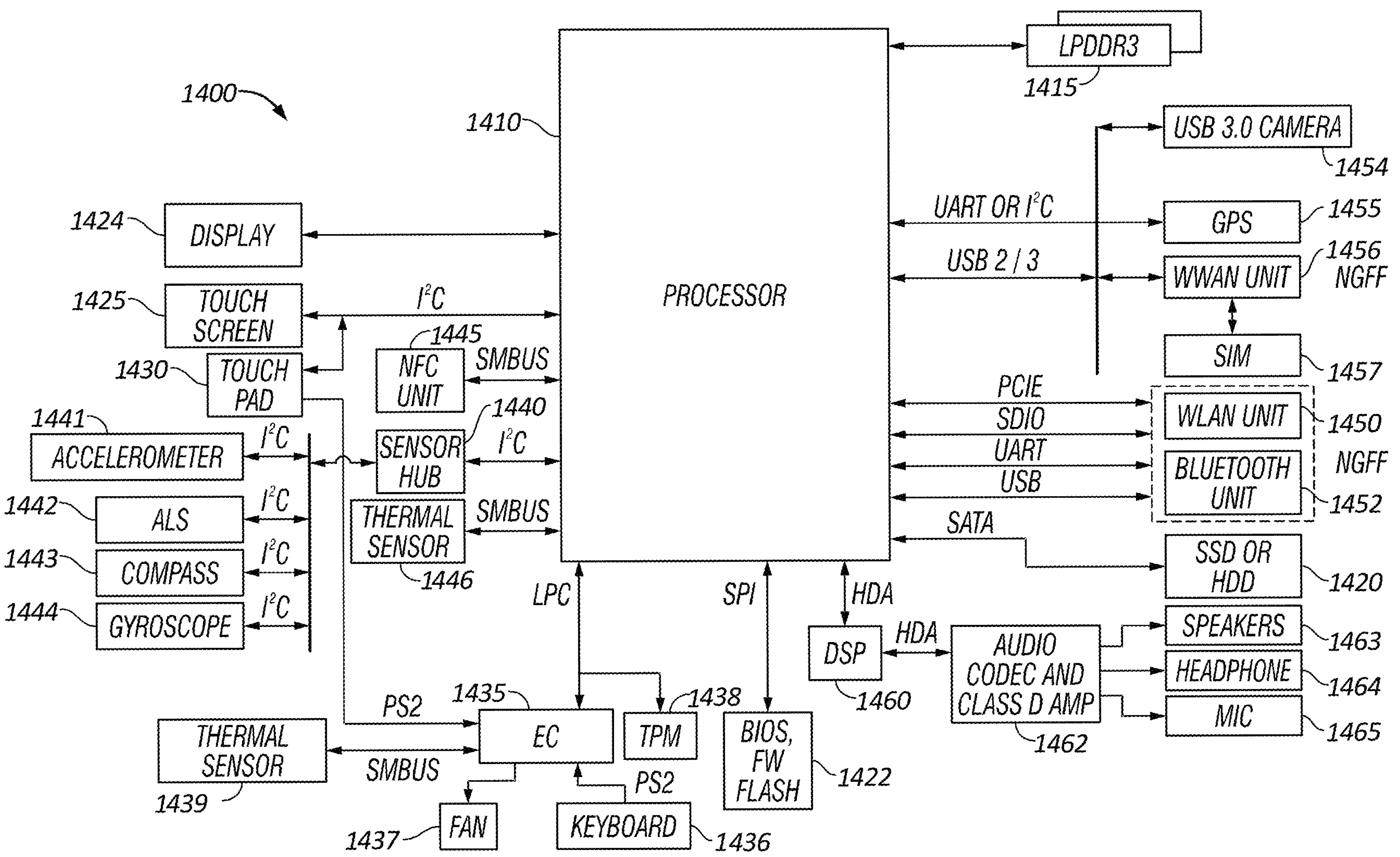
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I_{2c}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
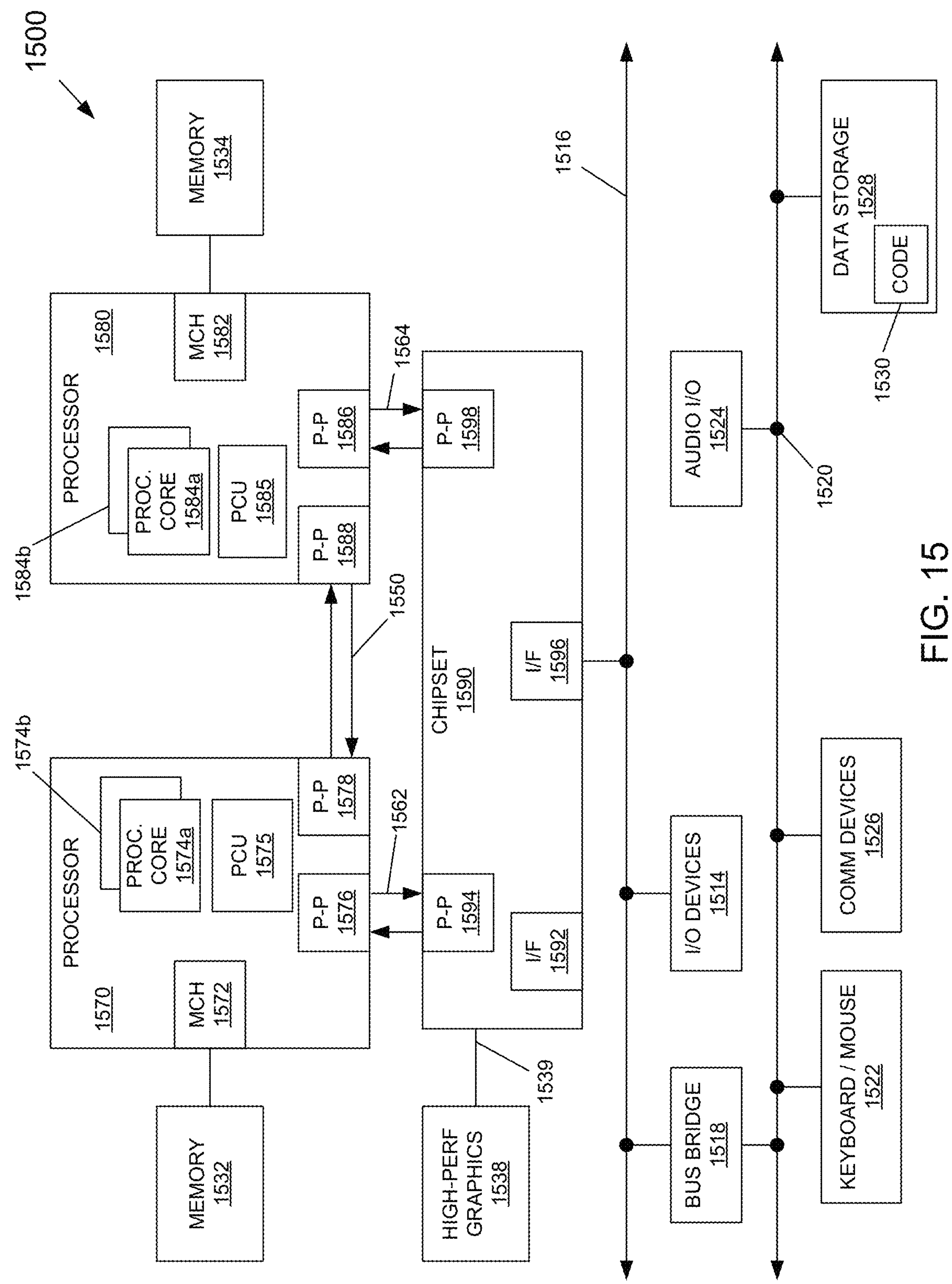
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574*a* and 1574*b* and processor cores 1584*a* and 1584*b*), although potentially many more cores may be present in the processors. Each of the processors can include a PCU 1575, 1585 to perform processor-based power management, including a license grant circuit 1559 to perform power license grants in response to request for non-speculative instruction execution, and pre-grants of frequency licenses for workload execution based on per core TDP values, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
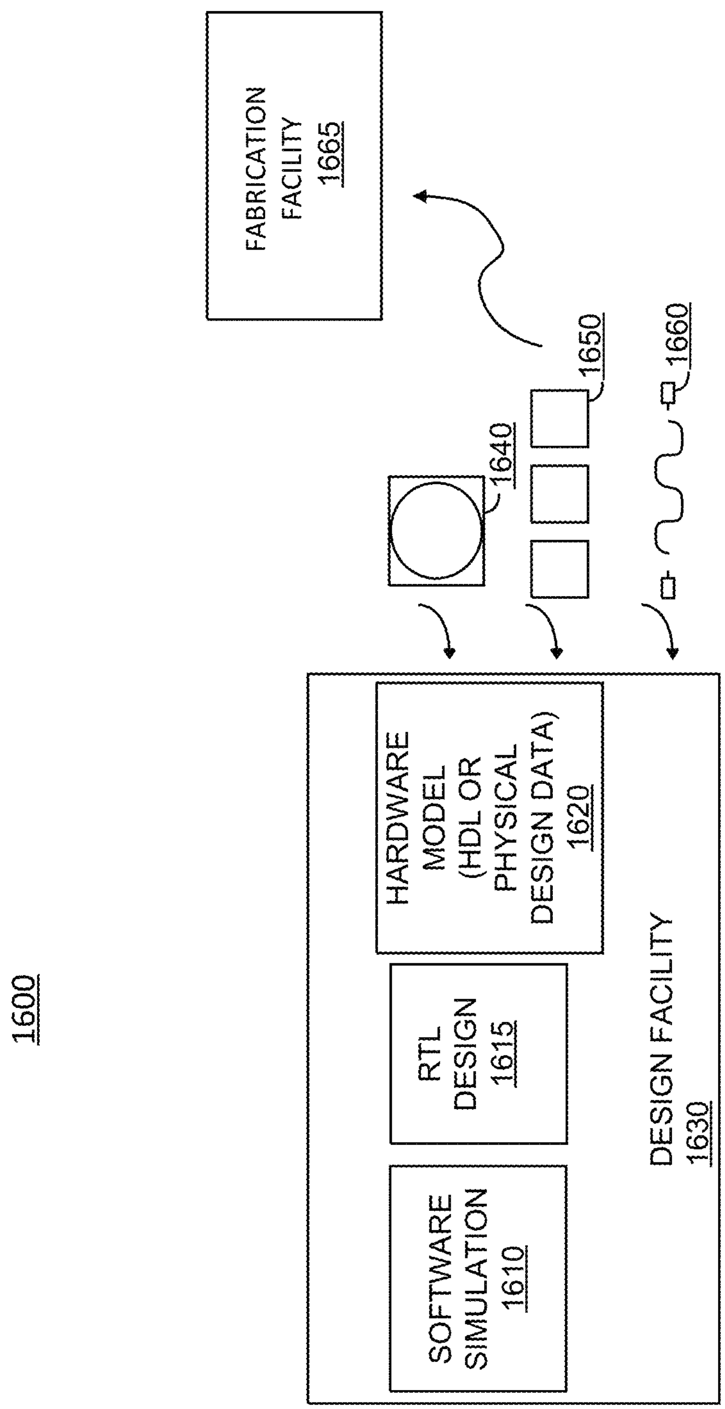
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
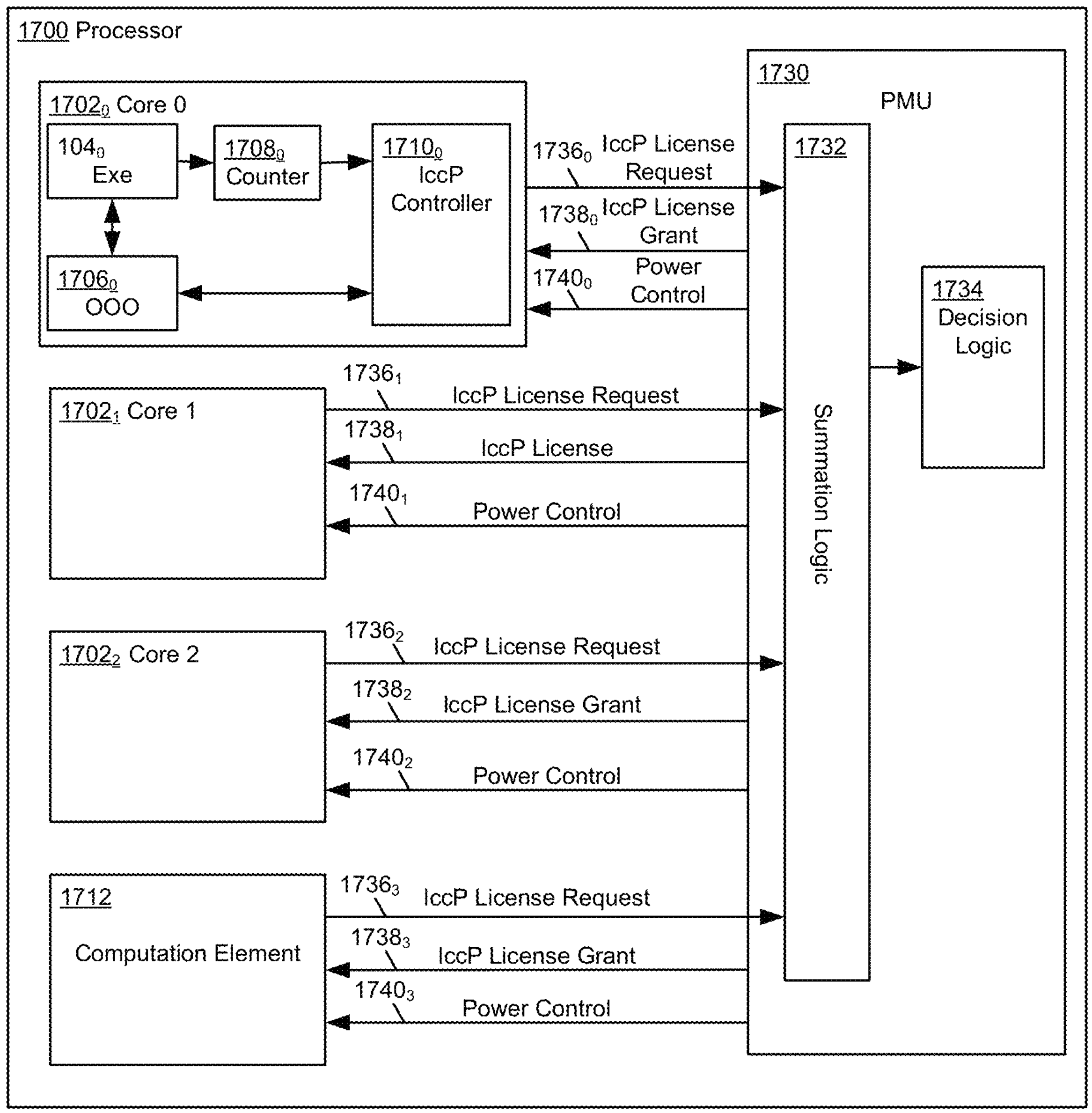
FIG. 17 is a block diagram of a processor according to an embodiment of the present invention.

Referring to FIG. 17, shown is a block diagram of a processor 1700 according to an embodiment of the present invention. The processor 1700 may include a plurality of cores $\mathbf{1702}_0$, $\mathbf{1702}_n$, and optionally at least one other computation element 1712, e.g., a graphics engine. As shown in core $\mathbf{1702}_0$ each core $\mathbf{1702}_i$ (i=1, n) may include an execution circuit $\mathbf{1704}_i$, an out-of-order (OOO) circuit $\mathbf{1706}_i$, counter circuit $\mathbf{1708}_i$, and a current protection (IccP) controller $\mathbf{1710}_i$. For example, core $\mathbf{1702}_0$ includes execution unit $\mathbf{1704}_0$, OOO circuit unit $\mathbf{1706}_0$, counter circuit $\mathbf{1708}_0$, and IccP controller $\mathbf{1710}_0$. The processor 1700 also includes a power management unit (PMU) 1730 that can include summation circuit 1732 and decision circuit 1734.

In operation, each of the cores $\mathbf{1702}_0, \ldots, \mathbf{1702}_n$ and the computation element 1712 may issue a respective IccP license request $\mathbf{1736}_0, \ldots \mathbf{1736}_n$. Each license request may be determined by a respective IccP controller $\mathbf{1710}_i$ of the core $\mathbf{1702}_i$ (e.g., IccP controller $\mathbf{1710}_0$ of core $\mathbf{1702}_0$) and the license request may be based on, e.g., a sum of power weights of a group of instructions to be executed during a designated time period by the respective execution unit 1704$_i$ (e.g., execution unit 1704$_0$ of core 1702$_0$). The sum of power weights may be determined by the counter logic 1708$_i$. For example, a size of the license request, e.g., magnitude of a maximum current (Icc) available to the core 1702$_i$ to execute the group of instructions in an execution queue to be executed in a first time period may be determined based on the sum of power weights of the group of instructions. Note that this sum of power weights may be based, at least in part on an instruction width of the instructions and a type of instructions, as it is recognized that certain instructions, even if of a larger width, do not incur the same power consumption as other instructions of that instruction width.

Each of the cores may request the PMU 1730 for a different license associated with a different level of Icc. The PMU 1730 may consider the license requests of the different cores and may determine actions according to the license requests. The actions may include, e.g., changing core frequency according to the license, increasing guard band voltage, or another mechanism that limits the power provided to the core. The PMU 1730 may decide, according to the license requested by the core, whether to raise guard band voltage, lose some performance (e.g., reduce core frequency), or another action, or a combination thereof. The PMU 1730 may then issue to each core/computation element (1702$_0$-1702$_n$, 1712) its respective license 1738$_0$, 1738$_1$, . . . 1738$_n$ (in FIG. 17, 1738$_0$-1738$_3$) that is associated with the maximum expected current draw (Icc) of the core/computation element.

For example, OOO logic 1706$_0$ can identify instructions in a first group that are in the execution queue to be executed during a first time period by the execution unit 1704$_0$ of the core 1702$_0$. The OOO logic 1706$_0$ can provide to the counter logic 1708$_0$ an indication of the instructions in the first group (e.g., an identification list). The counter logic 1708$_0$ may determine, (e.g., via a look-up table or other data storage, which in one embodiment may be provided by the execution logic 1704$_0$), a corresponding power weight for each of the instructions in the first group. Each power weight may have a respective value that is independent of corresponding instruction width. The counter logic 1708$_0$ can determine a sum of the power weights for the first group. The counter logic 1708$_0$ can provide the sum of power weights to the IccP controller 1710$_0$, which can determine, based on the sum of power weights, an IccP license request 1736$_0$ that is associated with a requested maximum current (Icc) of the core and can send the IccP license request 1736$_0$ to the PMU 1730. Note that in embodiments, the IccP controller 1710 can defer sending such license requests when it is determined that one or more instructions that form the basis of the license request are speculative instructions, as described further herein. Regardless, in response to received license requests for a power license level that exceeds a current power license level, the IccP controller 1710 may be configured to issue a throttle signal to throttle execution of instructions within the core 1702.

The PMU 1730 may receive IccP a respective license request from each of the cores 1702$_0$, . . . , 1702$_n$ (and optionally from one or more computation elements such as computation element 1712) and the PMU 1730 may determine a respective license for each of the cores and/or computation elements through a combination of the summation logic 1732 and the decision logic 1734. For example, in one embodiment the summation logic 1732 may sum the current requests of each of the IccP license requests, and the decision logic 1734 may determine a respective license 1738$_0$-1738$_n$ based on a sum of the requested Icc of the cores/computation element and total current capacity of the PMU 1730. The PMU 1730 may issue IccP licenses 1738$_0$-1738$_n$ to the respective cores 1702$_0$, . . . , 1702$_n$ and may also determine power control parameters 1740$_0$-1740$_n$ for the cores 1702$_0$, . . . , 1702$_n$. The power control parameters may include a respective core frequency and/or guard band voltage for each core/computation element. If (e.g., due to a higher than expected current demand) the issued IccP license is not sufficient to accommodate the power requirements of all instructions in the queue, the IccP controller can indicate to, e.g. a front end of one or more of the cores, that throughput is to be throttled (e.g., execution rate of instructions is to be reduced) and the respective IccP controller of the throttled core can also issue a request for an updated license having a higher Icc. In an embodiment, the throttling and the request for the license can happen before the first instruction in the queue is executed.

Figure 18:
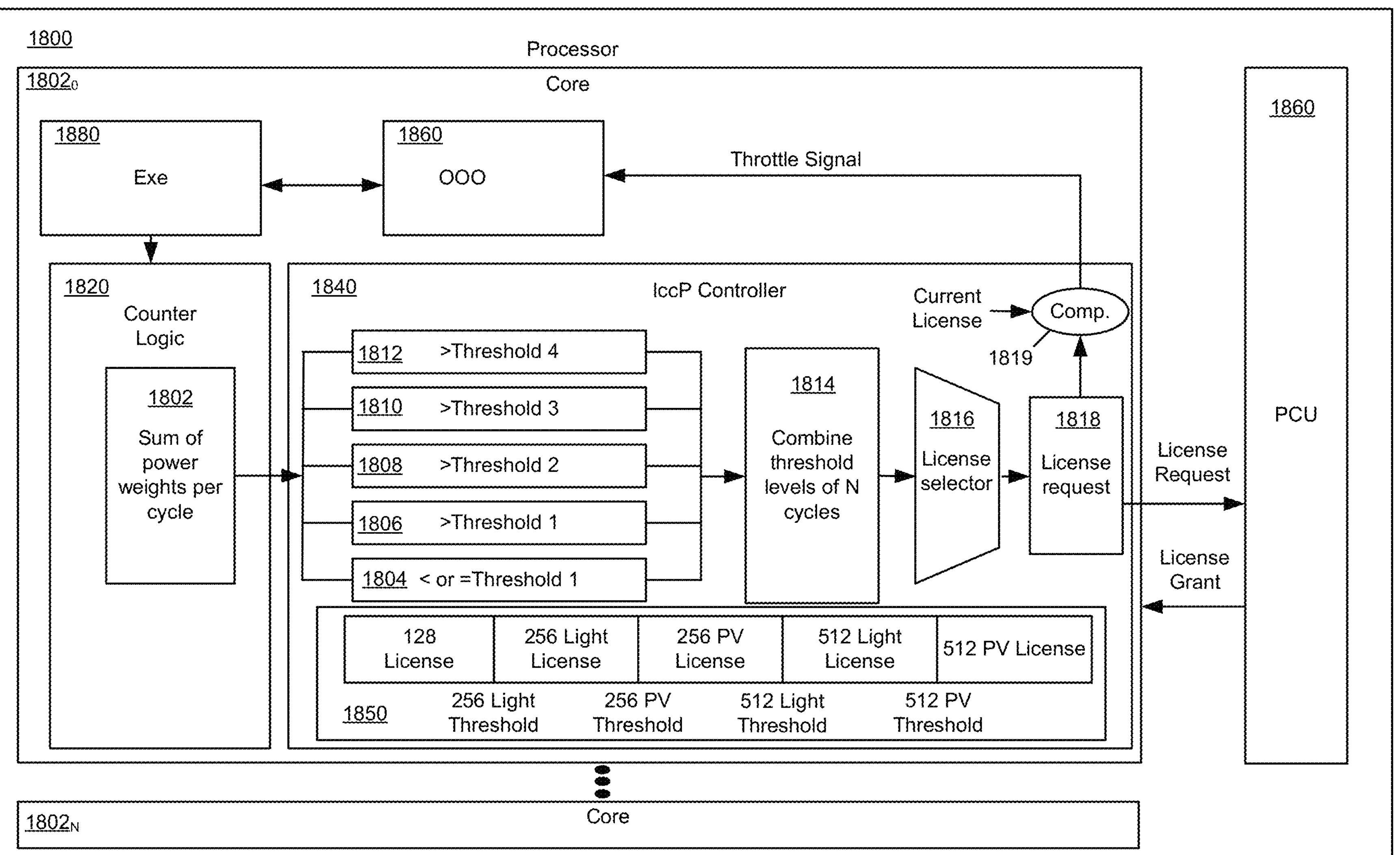
FIG. 18 is a block diagram of a processor, according to an embodiment of the present invention.

FIG. 18 is a block diagram of a processor, according to an embodiment of the present invention. The processor 1800 includes a plurality of cores 1802$_1$-1802$_N$. Core 1802$_1$ includes counter logic 1820, IccP controller 1840, out-of-order (OOO) logic 1860 and execution logic 1880, as well as other components (not shown). In operation, the counter logic 1820 may receive from the OOO 1860 an indication of each instruction to be executed in an execution queue for each cycle within a window of N cycles. The counter logic 1820 may determine a sum of power weights per cycle, e.g., by retrieval of a corresponding power weight associated with each instruction to be executed in the cycle, and addition of the retrieved power weights per cycle. The sum of power weights for a given cycle may be sent to the IccP controller 1840, which may categorize the sum of power weights for each cycle into one of a plurality of bins, each bin corresponding to a power range within a threshold level ("T"). As an example, five bins are shown. However, in other embodiments there may be more bins or less bins. As shown in FIG. 18, the bins are bin 1804 (less than or equal to threshold 1), bin 1806 (>T1 and ≤T2), bin 1808 (>T2 and ≤T3), bin 1810 (>T3 and ≤T4), and bin 1812 (>T4). The sum of power weights per cycle is placed into the appropriate bin, e.g., a count associated with the appropriate bin is increased by one. Note that IccP controller 1840 may access such threshold information present in a configuration register 1850, which may be used to generate these thresholds based on different levels of licenses available to execute instructions of different instruction widths and types, as described further herein.

After the power weights of N cycles are summed and the sum is placed into the appropriate bin, the results are combined at logic 1814. In an embodiment, the count of sums in each bin may be multiplied by the threshold level of the bin and results may be summed to determine a power measure of the instructions in the N cycles. That is, each sum may be treated as a single count of the bin. (For example, three sums placed in a particular bin may be treated as a count of three for the particular bin, etc.) In an embodiment, it may be determined that a count of A sums are in bin 1804 (T1), a count of B sums are in bin 1806 (T2), a count of C sums are in bin 1808 (T3), a count of D sums are in bin 1810 (T4), and a count of E sums are in bin 1812 (T5), and the power measure may be calculated as:

$$\text{power measure}=(T1)(A)+(T2)(B)+(T3)(C)+(T4)(D)+(T5)(E) \quad \text{(EQ. 1).}$$

The power measure may be sent to license selection circuit 1816, which may determine a magnitude of current protection (IccP) license to request based on the power measure. The license selection circuit 1816 may generate a corresponding license request 1818 to be sent to a power control unit (PCU) 1860.

Still further as illustrated in FIG. 18, when the IccP controller 1840 determines that a level of the license request is less than a current license level (as determined in a comparator 1819), a throttle signal may be sent to OOO 1860 to cause throttling of instruction execution within core 1802, as described herein.

Figure 19:
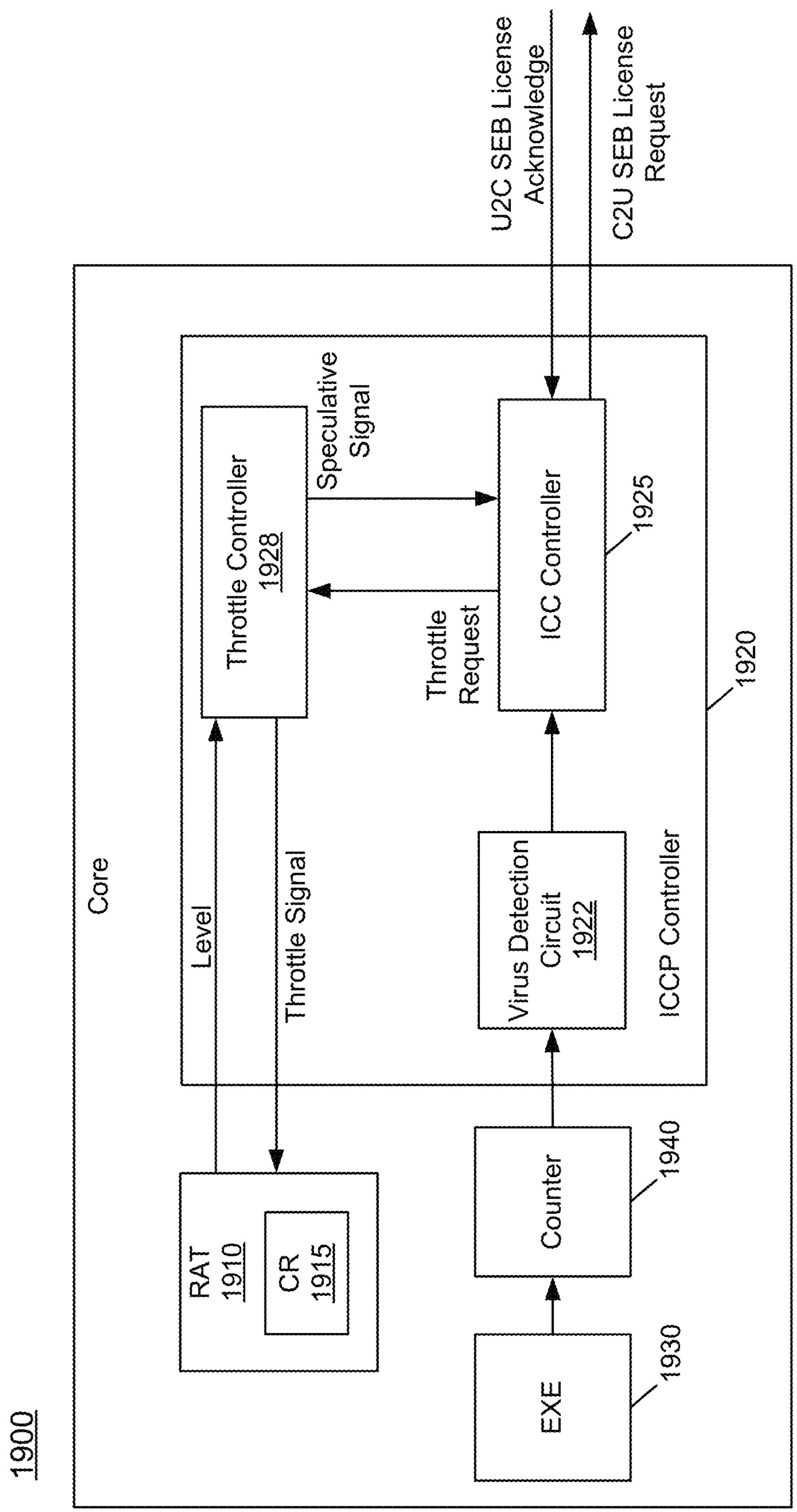
FIG. 19 is a block diagram of a processor core in accordance with an embodiment of the present invention.

Referring now to FIG. 19, shown is a block diagram of a processor core in accordance with an embodiment of the present invention. As shown in FIG. 19, core 1900 may be one of multiple processing cores in a given multicore processor or other SoC. In relevant part, core 1900 includes circuitry to identify instructions allocated for execution, including the instructions' widths and types, and execution circuitry to execute such instructions. In addition, current protection control circuitry is present to determine an appropriate current license to seek for execution of instructions based at least in part on the width and type of instructions. In addition, such controller may include circuitry to identify presence of speculative instructions and withhold license requests until such instructions become non-speculative.

As illustrated, core 1900 includes a register alias table (RAT) 1910, which may receive incoming instructions for allocation, e.g., in the form of uops. RAT 1910 may include one or more configuration registers 1915 that store information regarding default licenses for particular instruction types (including different default license levels based upon a width of at least some of these instructions). Based on an allocated instruction's width and type, and information in configuration register 1915, an appropriate default license level for that instruction may be determined. RAT 1910 may communicate this default license level to a current protection controller 1920. In addition, an execution circuit 1930 (which itself may include various execution logics) may communicate information regarding a relative weight of instructions executed per cycle, as a cycle weight, which it provides to a counter 1940. In turn, weighted count information is provided from counter 1940 to current protection controller 1920.

As further illustrated in FIG. 19, current protection controller 1920 includes constituent components, including a virus detection circuit 1922, an ICC controller 1925, and a throttle controller 1928. Based upon the weighted count information received from counter 1940, virus detection circuit 1922 may determine when a power virus is identified and issue a request for increased current to ICC controller 1925. Based at least in part on this information, ICC controller 1925 may issue a license request, which it sends to a power controller of a processor (not shown for ease of illustration in FIG. 19).

However, when it is determined that one or more instructions are speculative, ICC controller 1925 may defer sending of the license request, as it is possible that such one or more instructions do not actually execute. The speculative nature of such one or more instructions may be communicated from throttle controller 1928. Note that in response to a request for a given license level that is greater than a current license grant, throttle controller 1928 may issue a throttle signal (in response to a throttle request received from ICC controller 1925). As further illustrated, ICC controller 1925 further receives a license acknowledgement, e.g., from the power controller. Understand while shown at this high level in the embodiment of FIG. 19, many variations and alternatives are possible.

Referring now to FIG. 20, shown is a block diagram of a configuration storage, which may be present in a register alias table or other out of order engine of a processor. As illustrated in FIG. 20, configuration storage 2000 may be implemented with a plurality of registers $\mathbf{2020}_0$-$\mathbf{2020}_n$. Each such register may be associated with a given instruction (e.g., uop) type and may include a plurality of fields, each associated with a given width of the instruction. More specifically as illustrated in FIG. 20, each configuration register 2020 includes a plurality of fields including a type field 2010 to identify a given instruction (uop) and a plurality of width fields (2012, 2014, 2016, and 2018) each of which is associated with a given bit width of the instruction. As illustrated in the embodiment of FIG. 20, more specifically these bit widths range from 64 bits to 512 bits. Each field within each configuration register 2020 is configured to store a default license level corresponding to a suitable current consumption level to appropriately execute the instruction of that bit width. More specifically each field stores a numerical value which corresponds to a default license level that may be requested for proper execution of the instruction. Note that these default license levels may simply be numerical representations (e.g., on a scale of 0-3 in the example of FIG. 20) rather than an actual electrical current level. Of course each such default license level may correspond to a given actual current level.

Note that for certain wide instructions (e.g., load and store instructions) a default license level lower than a highest license level may be used. Further, at this lower default license level, it may be possible for certain high power consuming uops, e.g., 512-bit fused multiply add (FMA) uops to be executed in a single execution unit. However, multiple such execution units may not be powered unless a highest current license is granted.

Figure 21:
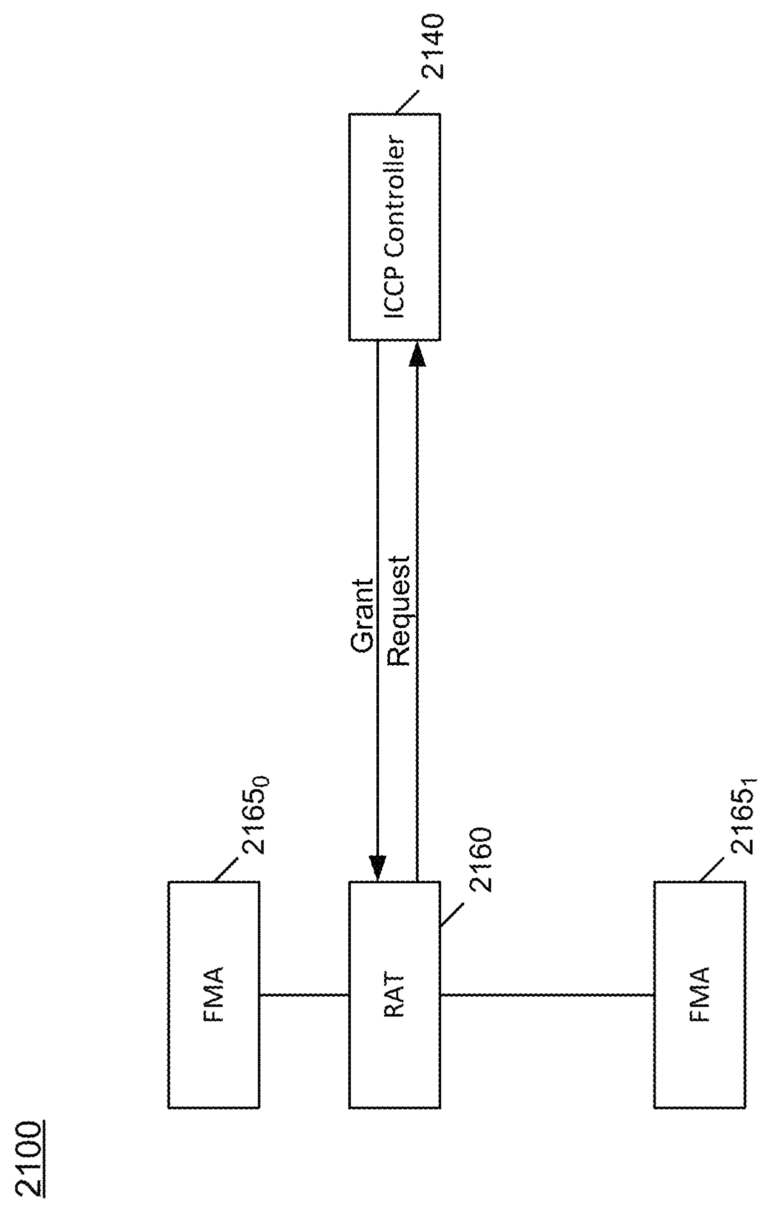
FIG. 21 is a block diagram of a portion of a processor in accordance with an embodiment.

Referring now to FIG. 21, shown is a block diagram of a portion of a processor in accordance with an embodiment. As shown in FIG. 21, a portion of a core 2100 is shown that includes a register alias table 2160 coupled to a ICCP controller 2140. As seen further, RAT 2160 couples to multiple fused multiply add (FMA) execution circuits $\mathbf{2165}_0$-$\mathbf{2165}_1$. In embodiments herein, by default at least one of these two FMA execution circuits 2165 may be power gated in the absence of a highest current license grant. As such, when a highest current license level grant is received, RAT 2160 may cause both FMA circuits $\mathbf{2165}_{0,1}$ to be activated and to issue uops (including 512 uops) to both execution circuits (each associated with a given execution port).

Figure 22:
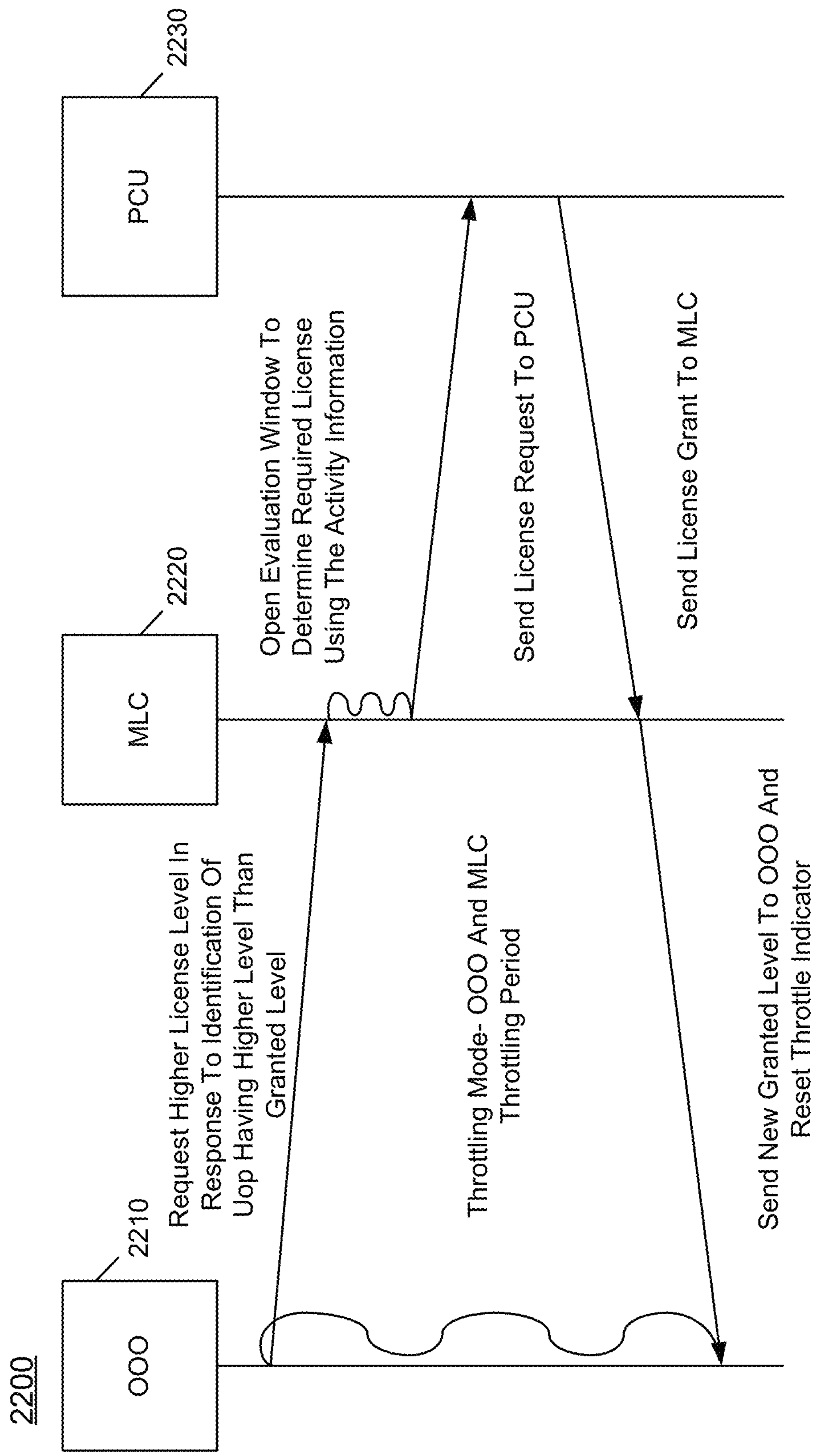
FIG. 22 is a flow diagram of a processor power management technique in accordance with an embodiment.

Referring now to FIG. 22, shown is a flow diagram of a processor power management technique in accordance with an embodiment. As shown in FIG. 22, method 2200 is initiated in OOO engine 2210 (generically OOO 2210), when it identifies an instruction (e.g., uop) that is to consume a higher current level than a currently granted current license level. As such, OOO 2210 issues a request for an increased current license to a MLC 2220. Note further that in response to this request for increased current license level, OOO 2210 and MLC 2220 may enter into a throttling period, which extends until the grant of the increased license level. Note that when MLC 2220 receives this request for an increased current level, it initiates an evaluation window (e.g., 64 cycles in an embodiment) to determine an appropriate license level to request based at least in part on weight information regarding instruction execution during the window.

At the conclusion of this window, MLC 2220 issues a license request for the appropriate current license level to a power control unit (PCU) 2230. Assuming sufficient budget is available, PCU 2230 grants the license, which is received in MLC 2220. In turn MLC 2220 forwards that license grant to OOO 2210, along with a reset of the throttle indication so that instructions may issue and execute without further throttling, including instructions (e.g., uops) that are of the higher power level sought by way of the license request (and now grant).

Figure 23:
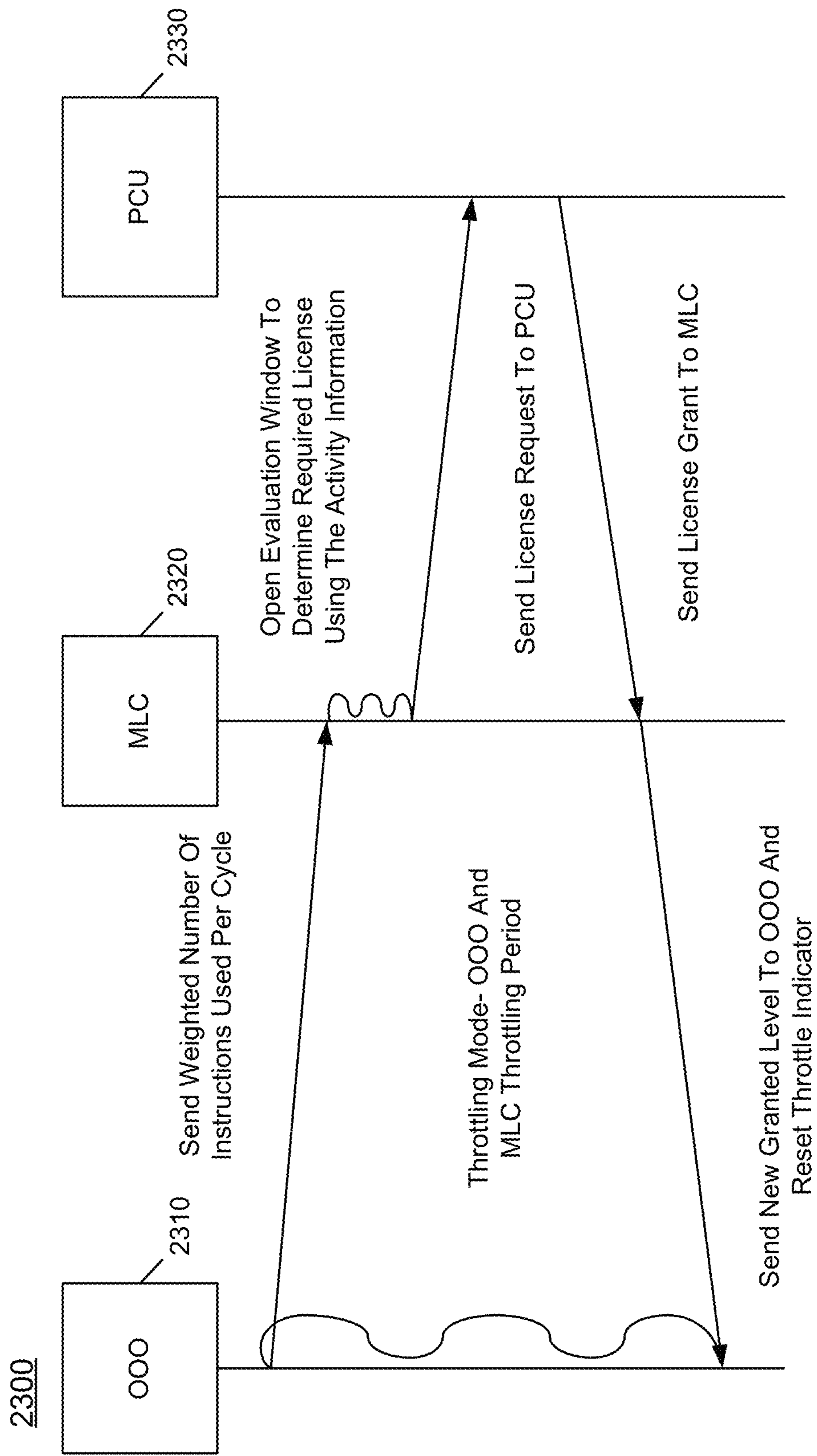
FIG. 23 is another flow diagram of a processor power management technique in accordance with an embodiment

Similarly, FIG. 23 shows another flow diagram of a processor power management technique in accordance with another embodiment. In FIG. 23, a method 2300 proceeds similarly between an OOO engine 2310, an MLC 2320, and a PCU 2330. In this method, as compared to method 2200, a weighted number of instructions per cycle may be used to request a higher license level. In other aspects, method 2300 may proceed as in method 2200.

Figure 24:
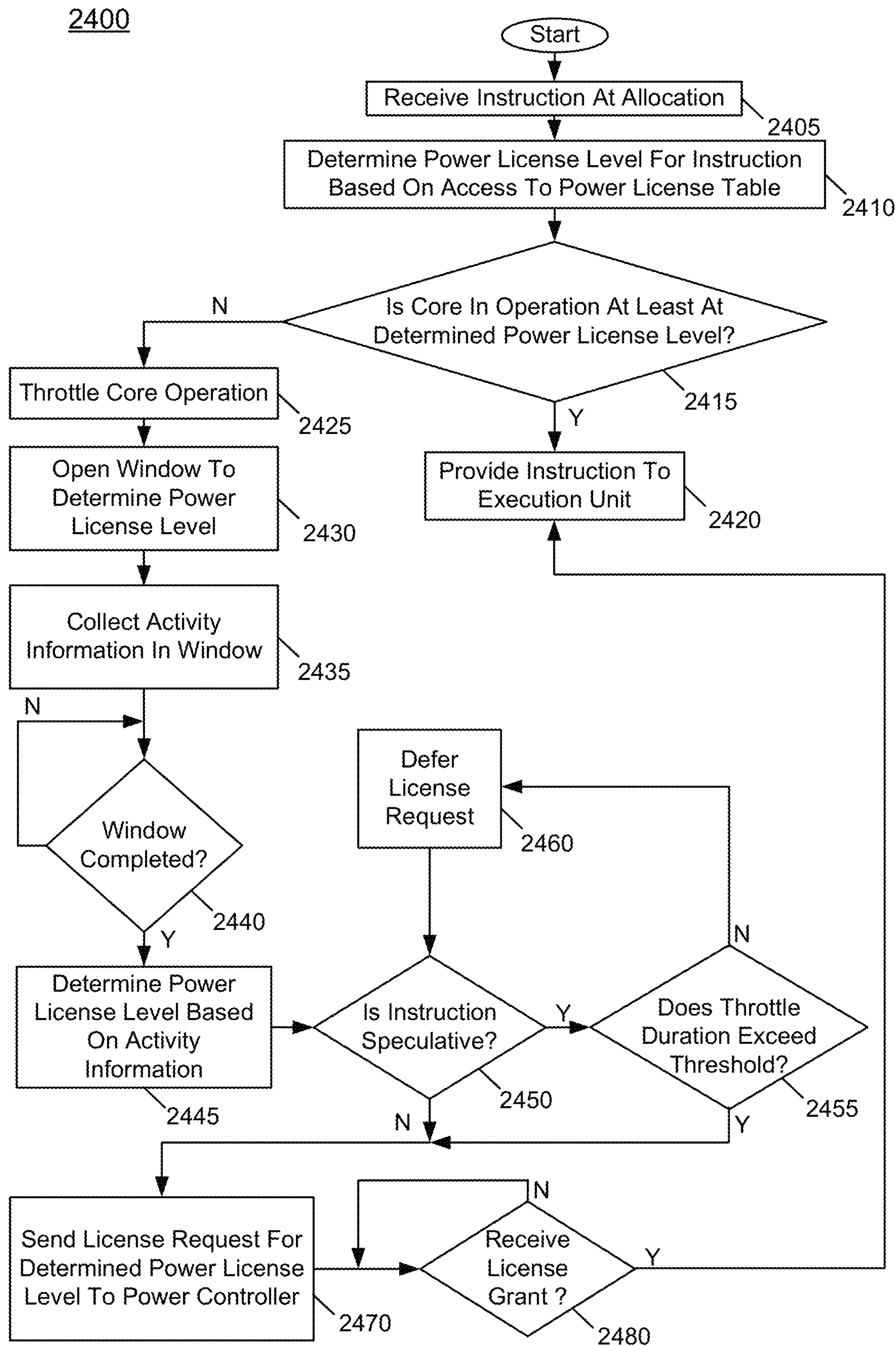
FIG. 24 is a flow diagram of a method in accordance with another embodiment of the present invention.

Referring now to FIG. 24, shown is a flow diagram of a method in accordance with another embodiment of the present invention. More specifically, method 2400 is a method for performing power control in a processor based at least in part on a license request and grant protocol as described herein. As such, method 2400 may be performed by current protection circuitry within a core and an associated power controller, and as such may be performed by hardware circuitry, firmware, software and/or combinations thereof.

As illustrated, method 2400 begins by receiving an instruction at allocation (block 2405). Such instruction may be received in an out-of-order engine such as a register alias table. A power license level for this instruction may be determined based on access to a power license table, which may be implemented within one or more configuration registers of the RAT. Next it is determined at diamond 2415 whether the core is in operation at least at this determined power license level. If so, the instruction is provided to a given execution unit for execution (block 2420).

Otherwise if it is determined that the core is not in operation at the requested power license level, at block 2425 core operation may be throttled. In addition at block 2430 an evaluation window may be opened to analyze core activity to determine an appropriate power license level. During this window, activity information may be collected (block 2435). Such activity information may be obtained on a cycle basis, with an indication of the number and width (and type) of instructions executed in each cycle. After it is determined at diamond 2440 that the window is completed (which in an example embodiment may be 64 cycles), a power license level may be determined based on activity information of the window (block 2445). For example, a current protection controller may identify an appropriate power level, e.g., with reference to a set of thresholds each associated with a given power license level.

Still with reference to FIG. 24 next it is determined whether the instruction (which triggered an increased power license level) is speculative (diamond 2450). If so, it is next determined whether the current throttle duration exceeds a given throttle threshold (diamond 2455). If not, issuance of the license request to a power controller may be deferred (block 2460). When it is determined either that the instruction is no longer speculative or that the throttle duration exceeds a threshold duration, at block 2470 the license request for the determined power license level is sent to the power controller. When it is determined (at diamond 2480) that this license grant is received, control passes to block 2420 where the instruction is provided for execution. Understand while shown at this high level in the embodiment of FIG. 24, many variations and alternatives are possible.

Figure 25:
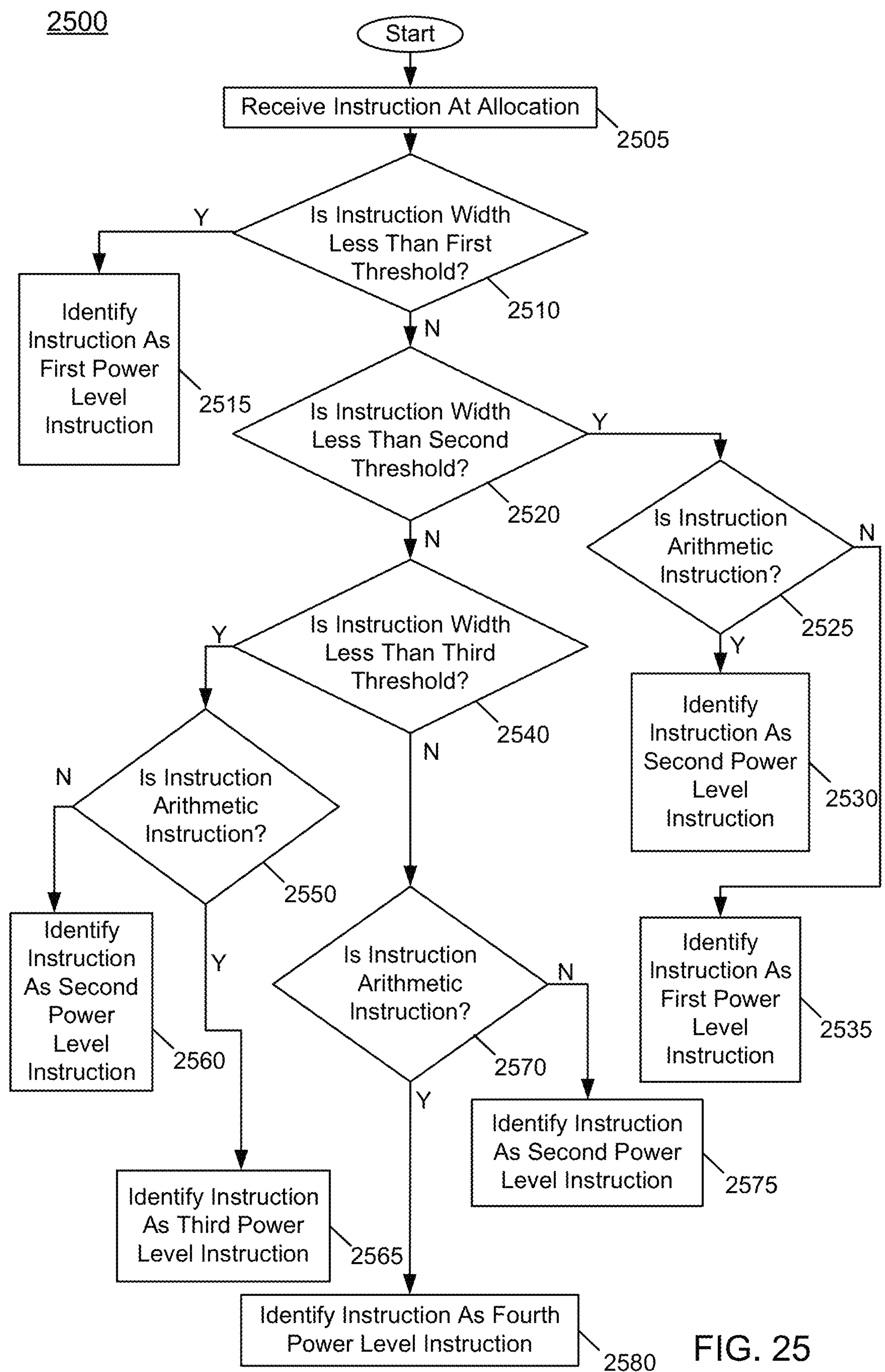
FIG. 25 is a flow diagram of a method in accordance with another embodiment of the present invention.

Referring now to FIG. 25, shown is a flow diagram of a method in accordance with another embodiment of the present invention. As shown in FIG. 25 method 2500 may be performed by current protection circuitry within a core and an associated power controller, and as such may be performed by hardware circuitry, firmware, software and/or combinations thereof.

As illustrated, method 2500 begins by receiving an instruction (e.g., uop) at allocation (block 2505). Such instruction may be received in a register alias table or other out-of-order engine. Next it is determined at diamond 2510 whether the instruction width is of a first threshold width (which in an example embodiment may be 64 bits). If so, the instruction may be identified as a first power level instruction (e.g., a lowest power level instruction) and thus a lowest power license level is sufficient for execution of this instruction (block 2515). Instead if it is determined at diamond 2520 that the instruction width is of a second threshold width (which in an embodiment may be 128 bits), it is next determined whether the instruction is an arithmetic instruction (at diamond 2525). If so, the instruction is identified as a second power level instruction, which may correspond to a second power license level (block 2530). Otherwise if the instruction is not an arithmetic instruction (e.g., is a load or store instruction), control passes to block 2535 where the instruction may be identified as a first power level instruction and thus the lowest power license level is sufficient for execution of this instruction (block 2535).

Still referring to FIG. 25, control passes from diamond 2520 to diamond 2540 to determine whether an instruction width is less than a third threshold. If so, it is next determined whether the instruction is an arithmetic instruction (at diamond 2550). If not, the instruction is identified as a second power level instruction corresponding to the second power license level (block 2560). Otherwise if the instruction is an arithmetic instruction, control passes to block 2565 where the instruction may be identified as a third power level instruction (greater than the first and second power levels) (block 2565).

Finally, if an instruction width exceeds the third threshold, control passes to diamond 2570, where it is determined whether the instruction is an arithmetic instruction. If so, the instruction is identified as a fourth, highest level instruction (block 2580). Otherwise if the instruction is not an arithmetic instruction, control passes to block 2575 where the instruction may be identified as a second power level instruction. Thus with embodiments, both instruction width and type may be considered in determining an appropriate power license level, realizing the ability to execute non-arithmetic wide instructions at lower power levels and with reduced latency, as throttling and increased license negotiation can be avoided for such instructions. Understand while shown at this high level in the embodiment of FIG. 25, many variations and alternatives are possible.

As described above, core circuitry may request power license grants before executing certain instruction types. While this arrangement is suitable to allow lower power operation when the high power needed for a relatively small number of high powered instructions, there can be some overhead and latency incurred in seeking such licenses (and which may lead to throttling for at least certain time durations, as discussed above). As such, embodiments may further configure a processor, at a relatively fine-grained level (e.g., on a per core basis), with a configurable thermal design power (TDP) level that acts as a pre-grant of a frequency license to ensure operation of a workload at a guaranteed operating frequency, even when the workload includes high power consuming instructions. Furthermore, with this arrangement, only those cores that are actually to execute such high power instructions may be provided with a lower configurable TDP value (and thus a corresponding lower guaranteed operating frequency) such that other cores may execute workloads lacking these higher power consuming instructions at higher configurable TDP levels (and thus higher corresponding guaranteed operating frequencies).

That is, one performance state available in a processor is a guaranteed performance state, also referred to as a P1 performance state, that provides a guaranteed operating frequency to ensure consistent performance with varying workloads. However, exceptions based on increased workload demands can result in deviations from this determinism, leading to jitter and irregular power management state changes. One particular exception for such non-determinism is the execution of high powered, compute-intensive instructions, such as certain vector instructions.

In embodiments, to provide consistent and deterministic behavior with varying workload, based on a given power budget, a per core configuration parameter for a configurable TDP setting can be realized. More specifically, embodiments may provide one or more configuration registers to which a scheduler may provide information to enable storage of a dynamic configurable TDP value for a given processor core or other processing circuit. Although the scope of the present invention is not limited in this regard, as examples such scheduler may be an operating system scheduler and/or a workload scheduler that has information regarding workloads to be scheduled to cores or other processing circuits.

Such configuration registers may be updated at least in part based on scheduling information dynamically, such as during the scheduling of a workload to a particular core, to enable the core to execute the workload in a deterministic manner by adhering to this configurable TDP value. A scheduler, during runtime, may provide the scheduling information to cause an update to these configuration registers. In an embodiment, the configuration registers may be implemented as one or more model specific registers (MSR's). In this way, a pre-grant of a frequency license may occur before execution of a given workload on a given core. And note that the scheduler may dynamically trigger a change to such configurable TDP value for a next workload, thus providing a pre-grant frequency license for this next workload. In embodiments, this per core configurable TDP arrangement may be exposed to schedulers and other entities e.g., by a flag setting in a processor identifier register such as a given CPUID register.

In contrast, in typical processors a processor-wide single TDP setting is available that is set during a pre-boot of a system, e.g., by a basic input/output system (BIOS). With this conventional arrangement, any change to a processor-wide single TDP value requires a resetting of the platform, which undesirably increases latency and complexity. In such typical arrangements, with different types of applications being executed on a processor, such boot-time platform-wide setting can be detrimental to the performance of various applications that use higher-powered instructions, such as various vector instructions including advanced vector extension (AVX) instructions (such as AVX2 and AVX-512) and additional ISA instructions such as streaming SIMD extension (SSE) instructions and so forth.

As a result, embodiments may provide performance improvements for heterogeneous workloads that use both vector-based and non-vector-based instructions by way of per core frequency license grants during runtime. Such runtime control may be realized using the one or more configuration registers, exposed to schedulers to enable pre-grant frequency licenses based on workloads to be executed on particular cores. In this way, heterogeneous workloads that may be typical in cloud-based deployments may be executed in a manner to allow complex real-time workloads to co-exist with non-real-time workloads at higher performance levels.

In various embodiments, schedulers may provide scheduling information in the form of a given power level for instructions present in a scheduling group. While this power level information may take different forms, in some cases, depending upon a type and width of instruction present in the scheduling group, the scheduler may provide one or more power levels of multiple such power levels to a PCU or other power controller. In turn, the power controller may map a maximum power level for instructions for the scheduling group to a given configurable TDP value, which it may store in a per core configuration register, as the scheduler may further provide an indication of the one or more cores on which a workload including this scheduling group is to be executed. Then the power controller may determine a guaranteed operating frequency based at least in part on the configurable TDP value. In this way, the scheduled instructions may execute without the need for power license negotiations during execution of the instructions and furthermore may operate at a guaranteed operating frequency that is selected to avoid a throttling or other condition.

Table 1 below shows an example set of power levels that may be associated with particular types of instructions. As seen, each of the different power levels may be associated with instructions of a particular type and width. As such, the scheduler may identify a maximum power consuming instruction of a scheduling group and provide the corresponding power level as the scheduling information, in one embodiment, along with an indication of the core(s) on which the scheduling group is to execute.

TABLE 1

| Power Level | Name | Voltage Level AVX Width | Max Turbo Schedule | Instructions |
|---|---|---|---|---|
| 1 | Non-AVX | 128/256 | SSE | AVX Scalar**, AVX 128, SSE, Everything Else |
| 2 | AVX2 Light | 128/256 | SSE | AVX2 w/out FP or INT MUL/FMA |
| 3 | AVX2 Heavy | 128/256 | AVX2 | AVX2 FP + INT MUL/FMA |
| 4 | AVX-512 Light | 512 | AVX2 | AVX-512 w/out FP or INT MUL/FMA |
| 5 | AVX-512 Heavy | 512 | AVX-512 | AVX-512 FP + INT MUL/FMA |

Still further, embodiments may realize higher performance and at a better performance per watt capability by providing per core frequency level grants. In addition, power savings may be realized at a per core level based on a given workload being executed. Embodiments also provide an interface to enable a cloud orchestrator to identify a target platform having on-demand frequency license grant capabilities to deploy particular workloads suited to such configurability. Although the scope of the present invention is not limited in this regard, such workloads may include software defined networking workloads, other telecom-based workloads, and other workloads including financial workloads, high performance computing and so forth. As examples, embodiments may enable scheduling of different layers of a wireless networking workload to different cores that operate at different configurable TDP values. For example, a physical layer (L1) portion of such workload may include high power consuming instructions and thus can be scheduled to cores that operate with lower TDP values than other core to which higher layer portions of the workload are scheduled.

With embodiments, a base guaranteed operating frequency may be kept relatively higher with the configurable core TDP capabilities. That is, while an overall computing platform may be set with a first TDP level, resulting in various cores or other processing units operating at a first P1 operating frequency, one or more other cores that are to execute higher current consuming workloads such as AVX workloads may be configured with a second, lower TDP level. As a result, these cores operate at a second P1 operating frequency, lower the first P1 operating frequency. Thus, improved performance can be realized instead of restricting the entire processor to this second, lower TDP level (and second P1 operating frequency). While embodiments described herein may base pre-grant license requests based on the presence of vector instructions, understand that other workloads that consume higher power may similarly cause a scheduler to request a lower configured TDP value for one or more cores to execute such workloads.

Figure 26:
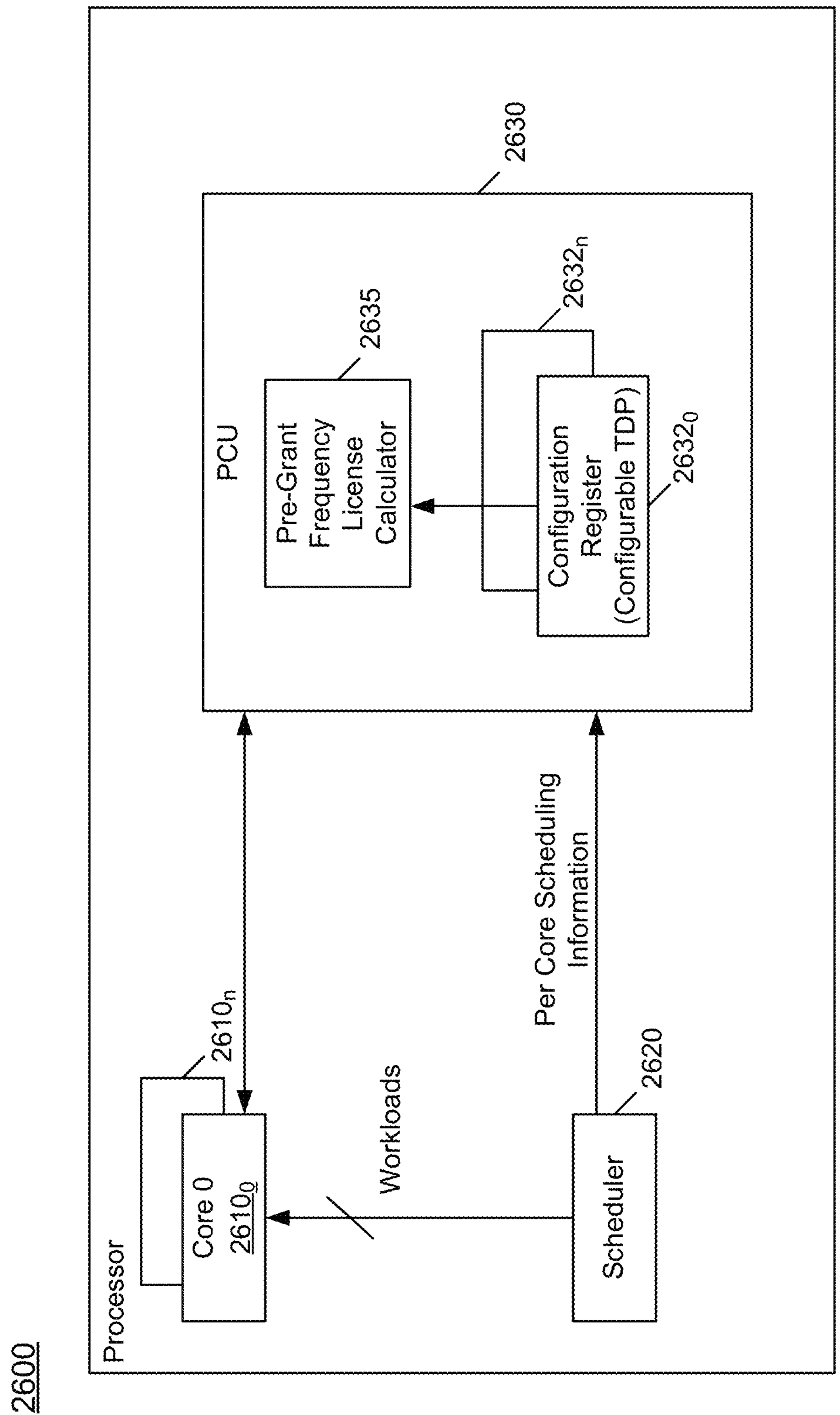
FIG. 26 is a block diagram of a processor in accordance an embodiment of the present invention.

Referring now to FIG. 26, shown is a block diagram of a processor in accordance an embodiment of the present invention. As shown in FIG. 26, processor 2600 may be a multicore processor or other type of SoC. As illustrated, processor 2600 includes a plurality of cores $\mathbf{2610}_0$-$\mathbf{2610}_n$. In different implementations, cores 2610 may be homogeneous cores, while in other cases at least some of the cores may be heterogeneous with respect to each other. In any event, a scheduler 2620, which itself may execute within processor 2600, provides workloads to cores 2610. And with embodiments herein, scheduler 2620 further may provide scheduling information as to the power consuming nature of the workload, to enable setting of configurable TDP information on a per core basis. In this way, embodiments may ensure that given workloads that execute on cores 2610 perform in a deterministic manner. That is, by way of setting a configurable TDP value for a given core 2610 on which a workload executes, deterministic performance is realized. This is so, as the selected core 2610 operates at a guaranteed operating frequency, without throttling or other perturbation from this guaranteed operating frequency to provide substantially deterministic execution of the workload.

To this end, as further illustrated in FIG. 26, scheduler 2620 provides per core scheduling information to a PCU 2630. Such information may include or be based on power levels such as shown above in Table 1. As illustrated, PCU 2630 includes a plurality of configuration registers $\mathbf{2632}_0$-$\mathbf{2632}_n$. More specifically, configuration registers 2632 may be provided on a per core basis, each to store a configurable TDP value as determined by the PCU based at least in part on scheduling information received from scheduler 2620. As further shown in FIG. 26, PCU 2630 also includes a pre-grant frequency license calculator 2635. In embodiments, frequency calculator 2635 may, based at least in part on a given configurable TDP value and other operating parameters, table information or so forth, determine a guaranteed operating frequency for a core 2610 that is to execute a particular workload. Thus, regardless of the power consuming nature of the instructions in the workload, such workload may execute on cores 2610, without any throttling or other perturbation, allowing deterministic operation at an appropriate guaranteed operating voltage and frequency.

As a concrete example, assume that a processor is configured with a nominal TDP level of 150 Watts. And, based on configuration information for the processor, with this nominal TDP level, a guaranteed operating frequency to allow operation to occur within this TDP budget may be at a first guaranteed operating frequency, e.g., 2.4 GHz. However, at such level of operation, should a workload include a substantial number of high power consuming instructions, one or more of a thermal limit, power limit, current limit or other environmental condition may be encountered, which would cause a throttling situation to occur, reducing this guaranteed operating frequency.

Instead in an embodiment when a scheduler determines that a workload includes high power consuming instructions, it communicates scheduling information to PCU 2630 to enable a setting in one or more configuration registers 2632 to a per core configurable TDP value lower than the nominal TDP value. And in turn, pre-grant license frequency calculator 2635 may determine a guaranteed operating frequency at a lower level, e.g., 2.2 GHz. At such operating frequency level, the workload may operate without reaching any type of limit, avoiding throttling and ensuring deterministic operation. Understand that while shown at this high level in the embodiment of FIG. 26, many variations and alternatives are possible.

Figure 27:
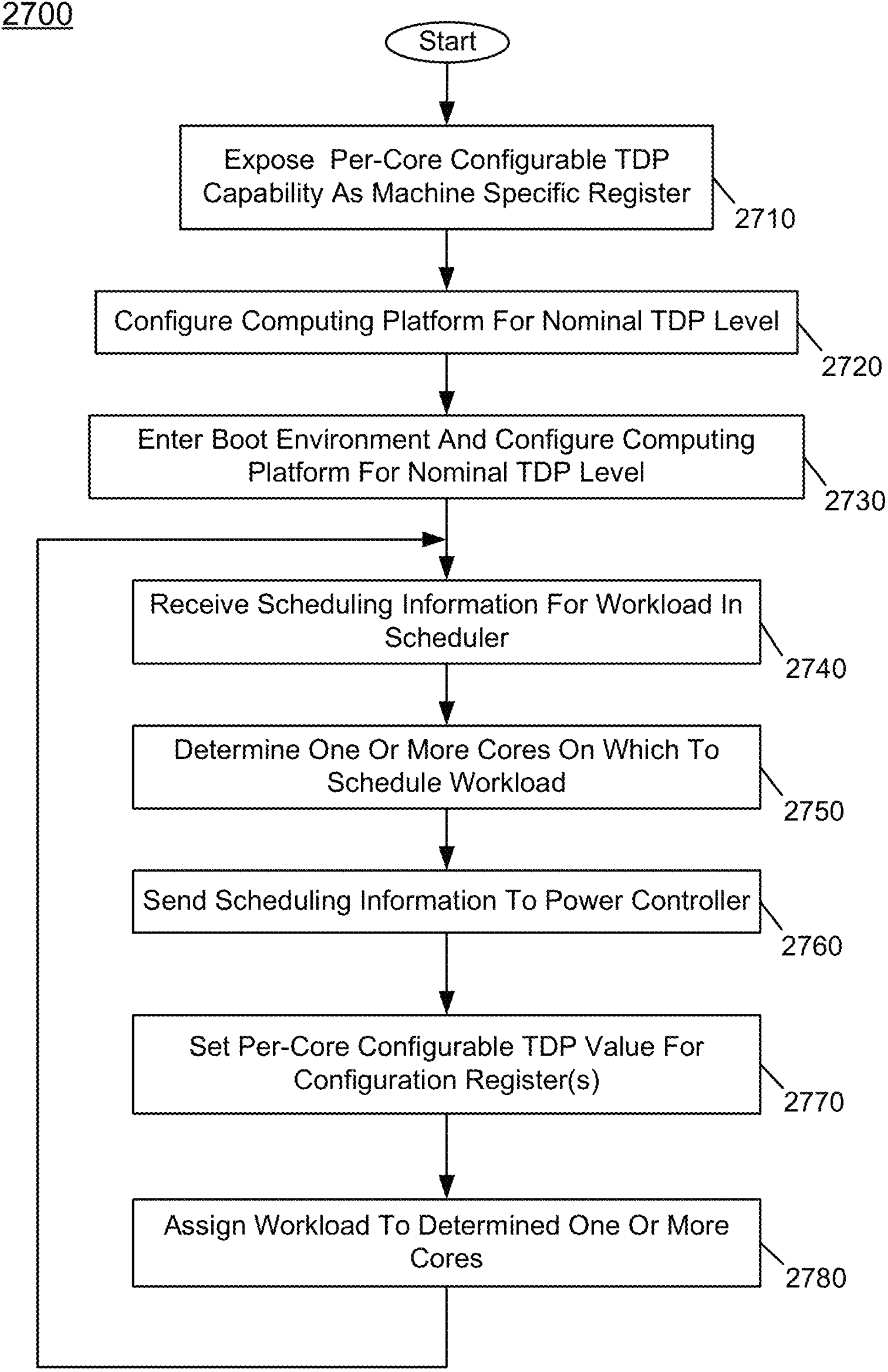
FIG. 27 is a flow diagram of a method in accordance with another embodiment of the present invention.

FIG. 27 is a flow diagram of a method in accordance with another embodiment of the present invention. More specifically, method 2700 is a method for performing per core configurable TDP control in accordance with an embodiment. As such, method 2700 may be performed by hardware, firmware, software and/or combinations thereof. As illustrated, method 2700 begins by exposing the per core configurable TDP capability as a machine specific register (block 2710). For example, a CPUID register may set a flag of a given field to identify the capability of the processor for such control.

Control next passes to block 2720 where a nominal TDP level may be configured for the computing platform. As an example, BIOS or other firmware may set this nominal level. Control next passes to block 2730, where the computing platform enters a boot environment, where the nominal TDP level may be set, e.g., by an OS. At this point, the platform is ready for normal operation.

As such, at block 2740 a scheduler may receive (or otherwise identify) scheduling information for a given workload. In an embodiment, this scheduling information may include power consumption information regarding instructions in the workload. For example, where the workload includes a substantial number of high power consuming instructions such as wide vector instructions, the scheduling information may identify a high power level, as shown in Table 1 above. Next at block 2750, the scheduler may determine one or more cores on which to schedule the workload. For example, in the case of heterogeneous cores, the scheduler may determine one or more cores on which to execute the workload based at least in part on a capability of a core to execute particular instructions of the workload. For example, in the case of vector-based instructions, one or more cores having vector execution unit may be selected.

Next, at block 2760 the scheduler may send scheduling information to the power controller. The scheduling information may include the power level as well as an indication of the one or more cores on which the workload is to execute. Control next passes to block 2770 where the PCU may set a per-core configurable TDP value for storage in at least one configuration register. Note that that as previously described, a pre-grant license frequency calculator within the PCU may select an appropriate guaranteed operating frequency for such as one or more cores based at least in part on this configurable TDP value. Finally, at block 2780, the scheduler may assign the workload to the determined one or more cores for execution. Thereafter, a scheduling loop may proceed back to block 2740 for scheduling of another workload. Understand while shown at this high level in the embodiment of FIG. 27, many variations and alternatives are possible.

The following examples pertain to further embodiments.

In one example, a processor includes a plurality of cores, where at least some of the plurality of cores include an execution circuit and a current protection controller. The current protection controller may be configured to: receive instruction width information and instruction type information associated with one or more instructions stored in an instruction queue prior to execution of the one or more instructions by the execution circuit; determine a power license level for the core based on the corresponding instruction width information and the instruction type information; generate a request for a license for the core corresponding to the power license level; and communicate the request to a power controller when the one or more instructions are non-speculative, and defer communication of the request when at least one of the one or more instructions is speculative. The processor may further include the power controller coupled to the plurality of cores to grant the license to the current protection controller in response to the request.

In an example, the processor further comprises a register alias table to store the instructions, the register alias table including a plurality of configuration registers to store default power license information for a plurality of instructions, the register alias table to send a default power license level for a first instruction to the current protection controller.

In an example, each of the plurality of configuration registers is associated with an instruction type and comprises a plurality of fields each associated with an instruction width and to store a default processor license level for the instruction type and the instruction width.

In an example, the register alias table is coupled to a first fused multiply-add circuit and a second fused multiply-add circuit, where at least the second fuse multiply-add circuit is to be gated unless the core receives the license grant having a highest level.

In an example, the register alias table is to cause the second fused multiply-add circuit to be activated when the core receives the power license grant having the highest level.

In an example, the current protection controller further comprises a throttle controller to send a throttle signal to the register alias table to throttle execution of the one or more instructions, in response to a determination that the default power license level for the first instruction exceeds a current power license level for the core.

In an example, the current protection circuit is to communicate the deferred request when a throttle duration of the throttle execution exceeds a threshold duration.

In an example, the current protection circuit is to communicate the deferred request, in response to retirement of the at least one speculative instruction.

In an example, the current protection controller is to generate the license request having the power license level of a first level for one or more vector memory access instructions and generate the license request having the power license level of a second level for one or more vector arithmetic instructions, the second level greater than the first level.

In an example, the execution circuit is to execute one or more 512-bit memory access instructions regardless of a current power license level for the core, without throttling.

In another example, a method comprises: receiving, in a power controller of a processor, from a scheduler, scheduling information to identify a power level associated with a first workload including one or more vector instructions and a first core of a plurality of cores of the processor on which the first workload is scheduled; based on the scheduling information, setting, by the power controller, a first configuration register associated with the first core to a first TDP value to configure the first core to operate in accordance with the first TDP value, the first TDP value independent of TDP values associated with other cores of the plurality of cores; and causing the first workload to deterministically execute on the first core at a first guaranteed operating frequency based on the first TDP value.

In an example, the method further comprises: receiving, in the power controller, from the scheduler, second scheduling information to identify a power level associated with a second workload and a second core of the plurality of cores of the processor on which the second workload is scheduled; based on the scheduling information, setting, by the power controller, a second configuration register associated with the second core to a second TDP value to configure the second core to operate in accordance with the second TDP value, the second TDP value greater than the first TDP value; and causing the second workload to deterministically execute on the second core at a second guaranteed operating frequency greater than the first guaranteed operating frequency.

In an example, the method further comprises: dynamically resetting the first configuration register to the second TDP value to configure the first core to operate in accordance with the second TDP value, during a single boot of the processor; and causing a third workload to deterministically execute on the first core at the second guaranteed operating frequency.

In an example, the method further comprises determining presence of a plurality of configuration registers to store per core configurable TDP values via a flag of an identification storage.

In an example, the method further comprises, during a pre-boot environment of the system, setting the plurality of configuration register to a nominal TDP value.

In an example, the method further comprises independently updating at least some of the plurality of configuration registers to independent TDP values, based on workloads to be executed by the plurality of cores, to cause the first core to operate at the first guaranteed operating frequency while at least one other core of the plurality of cores is to operate at a second guaranteed operating frequency greater than the first guaranteed operating frequency.

In an example, the first TDP value comprises a pre-grant of a frequency license for the first guaranteed operating frequency, to enable the first core to execute the first workload without throttling of the first core.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor and a dynamic random access memory coupled to the processor. The processor comprises a plurality of cores and a plurality of configuration registers, each to store a configurable TDP value for one of the plurality of cores, where the plurality of configuration registers are updatable during a single boot of the system. The processor further includes a power controller coupled to the plurality of cores, where the power controller is to receive scheduling information to identify a power level associated with a first workload including one or more vector instructions and a first core of the plurality of cores on which the first workload is scheduled, based on the scheduling information, set a first configuration register of the plurality of configuration registers to a first TDP value to configure the first core to operate in accordance with the first TDP value, while one or more others of the plurality of configuration registers are to store a nominal TDP value; and cause the first core to execute the first workload at a first guaranteed operating frequency based on the first TDP value.

In an example, the first core comprises: a current protection controller to: receive instruction width information and instruction type information associated with one or more instructions stored in an instruction queue prior to execution of the one or more instructions; determine a power license level for the core based on the corresponding instruction width information and the instruction type information; generate a request for a license for the first core corresponding to the power license level; and communicate the request to the power controller when the one or more instructions are non-speculative, and defer communication of the request when at least one of the one or more instructions is speculative.

In an example, the power controller, concurrently with execution of the first workload by the first core, is to: receive second scheduling information to identify a power level associated with a second workload and a second core of the plurality of cores on which the second workload is scheduled; and based on the second scheduling information, set a second configuration register of the plurality of configuration registers to a second TDP value to configure the second core to operate in accordance with the second TDP value; and cause the second core to execute the second workload at a second guaranteed operating frequency greater than the first guaranteed operating frequency based on the second TDP value.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:

a plurality of cores, wherein at least some of the plurality of cores comprise:

an execution circuit; and a current protection controller to:

receive instruction width information and instruction type information associated with one or more instructions stored in an instruction queue prior to execution of the one or more instructions by the execution circuit;

determine a power license level for the core based on the corresponding instruction width information and the instruction type information;

generate a power license request for the core corresponding to the power license level, wherein the power license request is a request message that is transmitted from the current protection controller of the core to a processor-level power controller to request a license for a specific power level, and wherein the power license request is not an instruction executable by the execution circuit;

determine whether the one or more instructions stored in the instruction queue are speculative;

communicate the power license request to the processor-level power controller in response to a determination that the one or more instructions stored in the instruction queue are non-speculative; and defer communication of the power license request to the processor-level power controller in response to a determination that at least one of the one or more instructions stored in the instruction queue is speculative; and the processor-level power controller coupled to the plurality of cores to grant a power license to the current protection controller in response to the power license request.

2. The processor of claim 1, further comprising a register alias table to store the instructions, the register alias table including a plurality of configuration registers to store default power license information for a plurality of instructions, the register alias table to send a default power license level for a first instruction to the current protection controller.

3. The processor of claim 2, wherein each of the plurality of configuration registers is associated with an instruction type and comprises a plurality of fields each associated with an instruction width and to store a default processor license level for the instruction type and the instruction width.

4. The processor of claim 2, wherein the register alias table is coupled to a first fused multiply-add circuit and a second fused multiply-add circuit, wherein at least the second fuse multiply-add circuit is to be gated unless the core receives the license grant having a highest level.

5. The processor of claim 2, wherein the current protection controller further comprises a throttle controller to send a throttle signal to the register alias table to throttle execution of the one or more instructions, in response to a determination that the default power license level for the first instruction exceeds a current power license level for the core.

6. The processor of claim 1, wherein the current protection controller is to communicate the deferred power license request in response to a determination that a throttle duration of the one or more instructions exceeds a threshold duration.

7. The processor of claim 1, wherein the current protection controller is to communicate the deferred power license request in response to retirement of the at least one speculative instruction.

8. The processor of claim 1, wherein the current protection controller is to generate the power license request having the power license level of a first level for one or more vector memory access instructions, and generate the power license request having the power license level of a second level for one or more vector arithmetic instructions, the second level greater than the first level.

9. The processor of claim 1, wherein the execution circuit is to execute one or more 512-bit memory access instructions regardless of a current power license level for the core, without throttling.

10. A non-transitory machine-readable medium having stored thereon instructions, which if performed by a machine cause the machine to perform a method comprising:

receiving, in a power controller of a processor, from a scheduler, scheduling information indicating a power level associated with a first workload including one or more vector instructions and a first core of a plurality of cores of the processor on which the first workload is scheduled;

based on the scheduling information, setting, by the power controller, a first configuration register associated with the first core to a first power configuration setting to configure the first core to operate in accordance with the first power configuration setting, wherein the first power configuration setting is a thermal design power (TDP) value indicating a power limit of the first core, and wherein the first power configuration setting is independent of power configuration settings associated with other cores of the plurality of cores;

determining a first guaranteed operating frequency based on the first power configuration setting in the first configuration register; and causing the first workload to execute on the first core at the first guaranteed operating frequency based on the first power configuration setting in the first configuration register, wherein the first guaranteed operating frequency is unmodified during execution of the first workload.

11. The machine-readable medium of claim 10, wherein the method further comprises:

receiving, in the power controller, from the scheduler, second scheduling information indicating a power level associated with a second workload and a second core of the plurality of cores of the processor on which the second workload is scheduled;

based on the scheduling information, setting, by the power controller, a second configuration register associated with the second core to a second power configuration setting to configure the second core to operate in accordance with the second power configuration setting, the second power configuration setting greater than the first power configuration setting;

determining a second guaranteed operating frequency based on the second power configuration setting in the second configuration register; and causing the second workload to execute on the second core at the second guaranteed operating frequency based on the second power configuration setting in the second configuration register, wherein the second guaranteed operating frequency is unmodified during execution of the second workload, and wherein the second guaranteed operating frequency is greater than the first guaranteed operating frequency.

12. The machine-readable medium of claim 11, wherein the method further comprises:

dynamically resetting the first configuration register to the second power configuration setting to configure the first core to operate in accordance with the second power configuration setting, during a single boot of the processor; and causing a third workload to execute on the first core at the second guaranteed operating frequency, wherein the second guaranteed operating frequency is unmodified during execution of the third workload.

13. The machine-readable medium of claim 10, wherein the method further comprises determining presence of a plurality of configuration registers to store per core power configuration settings via a flag of an identification storage.

14. The machine-readable medium of claim 13, wherein the method further comprises, during a pre-boot environment of the system, setting the plurality of configuration registers to a nominal power configuration setting.

15. The machine-readable medium of claim 14, wherein the method further comprises independently updating at least some of the plurality of configuration registers to independent power configuration settings, based on workloads to be executed by the plurality of cores, to cause the first core to operate at the first guaranteed operating frequency while at least one other core of the plurality of cores is to operate at a second guaranteed operating frequency greater than the first guaranteed operating frequency.

16. The machine-readable medium of claim 10, wherein the first power configuration setting comprises a pre-grant of a frequency license for the first guaranteed operating frequency, to enable the first core to execute the first workload without throttling of the first core.

17. A system comprising:

a processor comprising:

a plurality of cores;

a plurality of configuration registers, each to store a power configuration setting for one of the plurality of cores, wherein the plurality of configuration registers are updatable during a single boot of the system; and a power controller coupled to the plurality of cores, wherein the power controller is to:

receive scheduling information indicating a power level associated with a first workload including one or more vector instructions and a first core of the plurality of cores on which the first workload is scheduled;

based on the scheduling information, set a first configuration register of the plurality of configuration registers to a first power configuration setting to configure the first core to operate in accordance with the first power configuration setting, while one or more others of the plurality of configuration registers are to store a nominal power configuration setting, wherein the first power configuration setting is a thermal design power (TDP) value indicating a power limit of the first core;

determine a first guaranteed operating frequency based on the first power configuration setting in the first configuration register; and cause the first core to execute the first workload at the first guaranteed operating frequency based on the first power configuration setting in the first configuration register, wherein the first guaranteed operating frequency is unmodified during execution of the first workload; and a dynamic random access memory coupled to the processor.

18. The system of claim 17, wherein the first core comprises:

a current protection controller to:

receive instruction width information and instruction type information associated with one or more instructions stored in an instruction queue prior to execution of the one or more instructions;

determine a power license level for the core based on the corresponding instruction width information and the instruction type information;

generate a power license request for the first core corresponding to the power license level;

determine whether the one or more instructions are speculative; and communicate the power license request to the power controller in response to a determination that the one or more instructions are non-speculative, and defer communication of the power license request in response to a determination that at least one of the one or more instructions is speculative.

19. The system of claim 17, wherein the power controller, concurrently with execution of the first workload by the first core, is to:

receive second scheduling information indicating a power level associated with a second workload and a second core of the plurality of cores on which the second workload is scheduled; and based on the second scheduling information, set a second configuration register of the plurality of configuration registers to a second power configuration setting to configure the second core to operate in accordance with the second power configuration setting; and cause the second core to execute the second workload at a second guaranteed operating frequency greater than the first guaranteed operating frequency, wherein the second guaranteed operating frequency is determined based on the second power configuration setting in the second configuration register.

* * * * *

UNITED STATES PATENT AND TRADEMARK OFFICE

CERTIFICATE OF CORRECTION

PATENT NO. : 11,409,560 B2
APPLICATION NO. : 16/367581
DATED : August 9, 2022
INVENTOR(S) : Krishnamurthy Jambur Sathyanarayana et al.

It is certified that error appears in the above-identified patent and that said Letters Patent is hereby corrected as shown below:

In the Drawings

Drawing Sheet 17 of 27:
Figure 17, Block $\underline{1702_0}$ Core 0, "$104_0$" should be --$1704_0$--

Signed and Sealed this
Eighteenth Day of April, 2023

Katherine Kelly Vidal
*Director of the United States Patent and Trademark Office*